United States Patent
Bragas et al.

4,251,797
Feb. 17, 1981

[54] VEHICULAR DIRECTION GUIDANCE SYSTEM, PARTICULARLY FOR INTERCHANGE OF INFORMATION BETWEEN ROAD MOUNTED UNITS AND VEHICLE MOUNTED EQUIPMENT

[75] Inventors: Peter Bragas, Hildesheim; Bernd Eschke, Detfurth, both of Fed. Rep. of Germany

[73] Assignee: Robert Bosch GmbH, Stuttgart, Fed. Rep. of Germany

[21] Appl. No.: 814,901

[22] Filed: Jul. 12, 1977

[30] Foreign Application Priority Data

Jul. 14, 1976 [DE] Fed. Rep. of Germany ....... 2631543

[51] Int. Cl.$^3$ .................... G08G 1/00; G08C 21/00
[52] U.S. Cl. ........................................ 340/32; 340/23; 340/152 T; 375/62
[58] Field of Search ............... 340/38 L, 38 R, 32, 340/152 T, 23, 24; 246/122 R, 178, 191, 194, 167 R; 325/163; 375/62

[56] References Cited

U.S. PATENT DOCUMENTS

| | | | |
|---|---|---|---|
| 3,859,624 | 1/1975 | Kriofsky | 340/38 L |
| 3,996,555 | 12/1976 | Dow | 340/38 L |
| 4,041,448 | 8/1977 | Noens | 340/32 |
| 4,068,211 | 1/1978 | Van Tol | 340/32 |
| 4,083,008 | 4/1978 | Eschke | 340/32 |

FOREIGN PATENT DOCUMENTS 2515660 10/1976 Fed. Rep. of Germany .

Primary Examiner—John W. Caldwell, Sr.
Assistant Examiner—James J. Groody
Attorney, Agent, or Firm—Frishauf, Holtz, Goodman & Woodward

[57] ABSTRACT

A circuit is provided to detect the direction of movement of the vehicle with respect to a fixed road mounted loop, which can then extend over opposing lanes of a highway network, the direction detecting equipment being mounted either on the vehicle, or connected to the road mounted unit so that correct destination guidance information can be transmitted to vehicles passing a loop embedded in the roadway upon transmitting from the vehicle to the roadway a target or destination code.

7 Claims, 16 Drawing Figures

Figure 6:
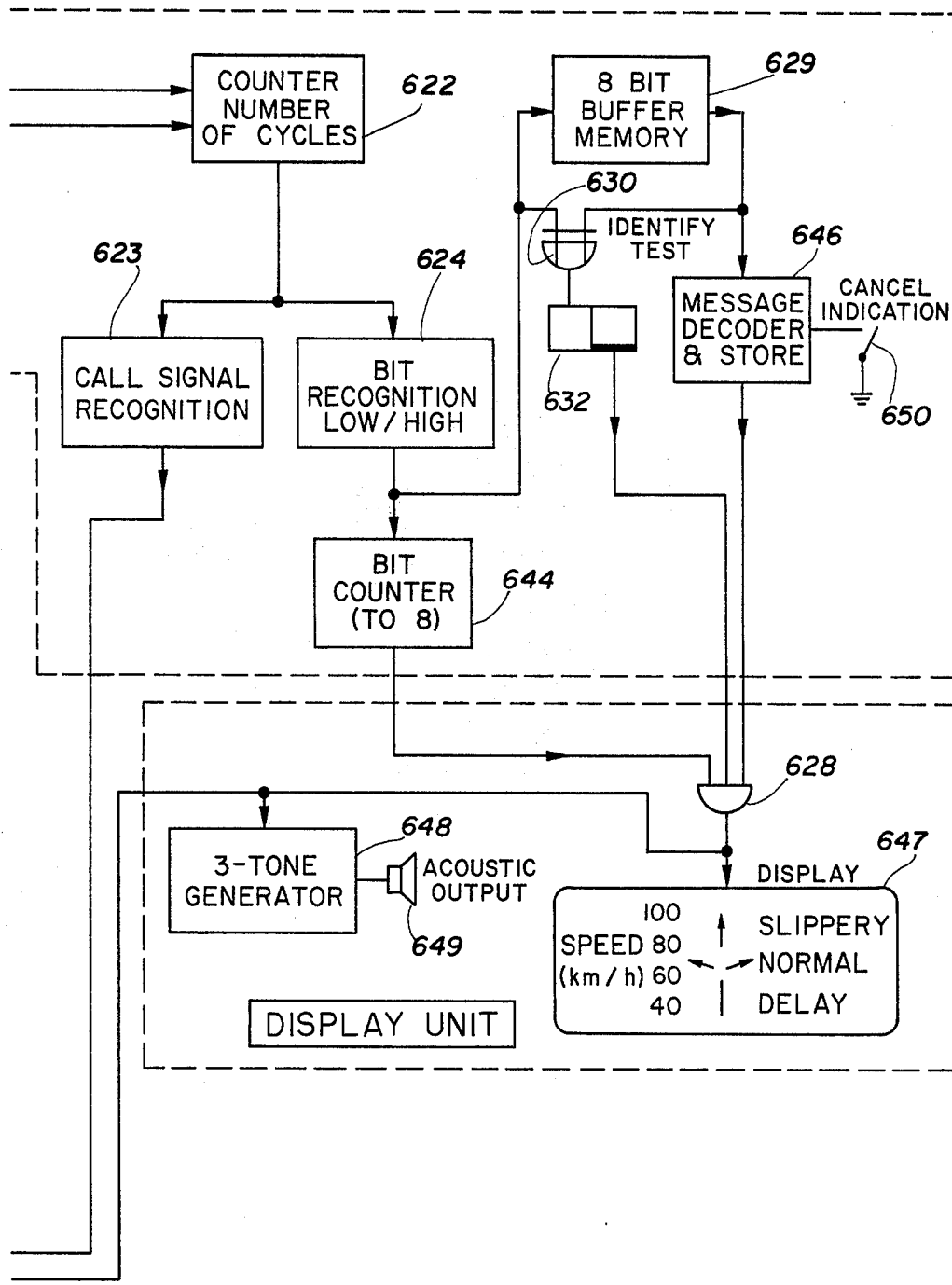

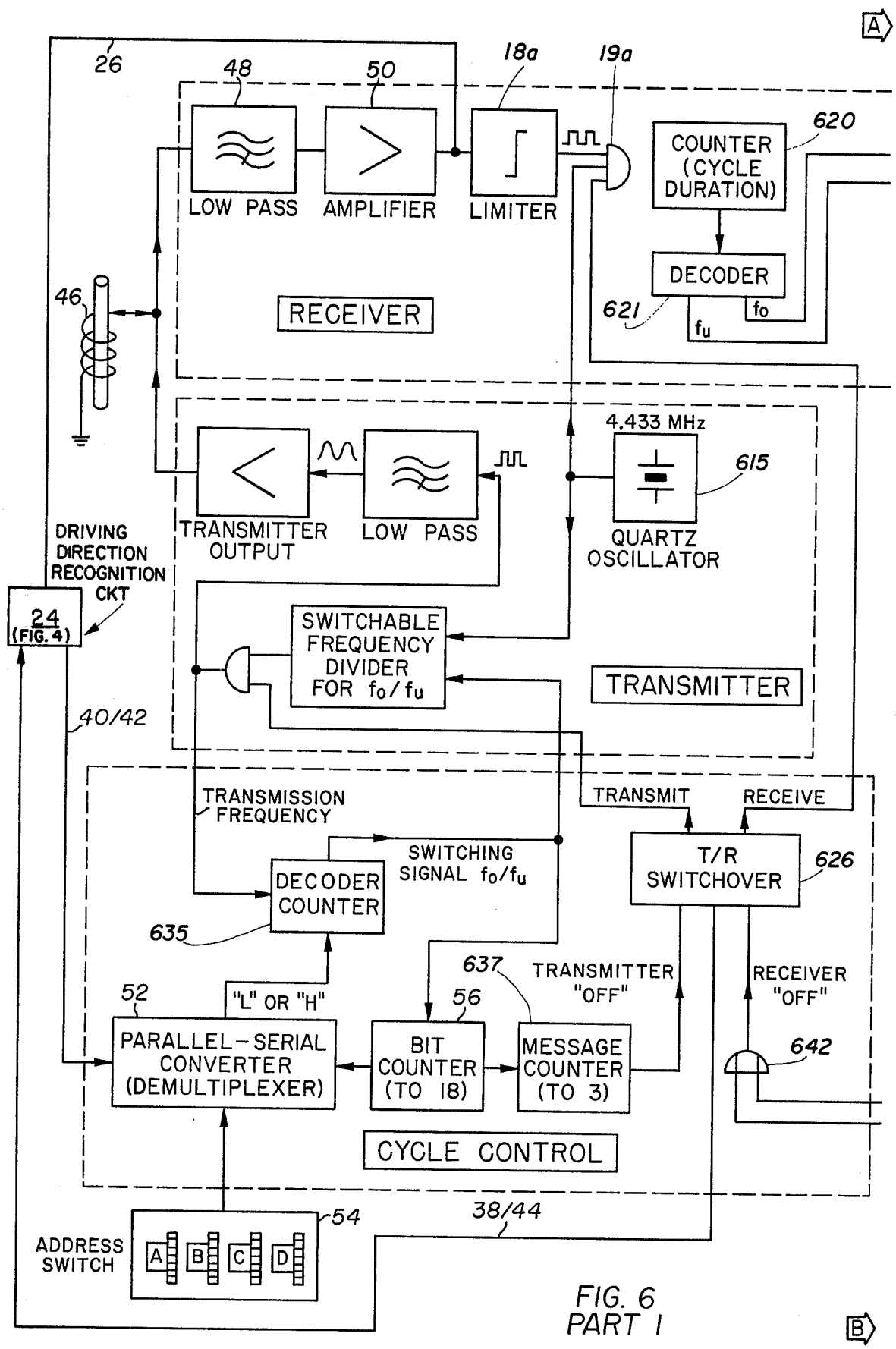
FIG. 6 PART 1

PART 2

PART 1

PART 2

PART 1

PART 2

Figure 15:
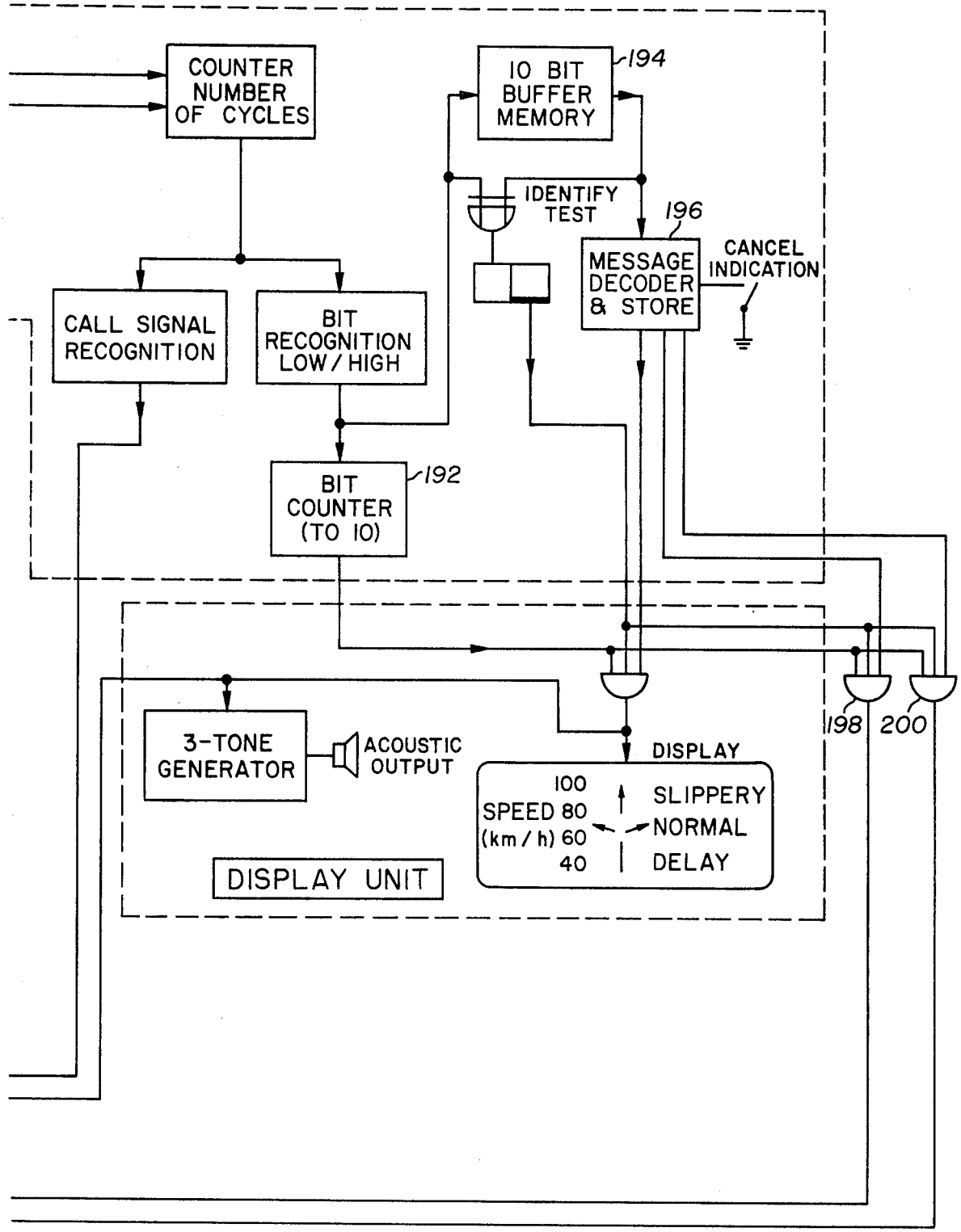

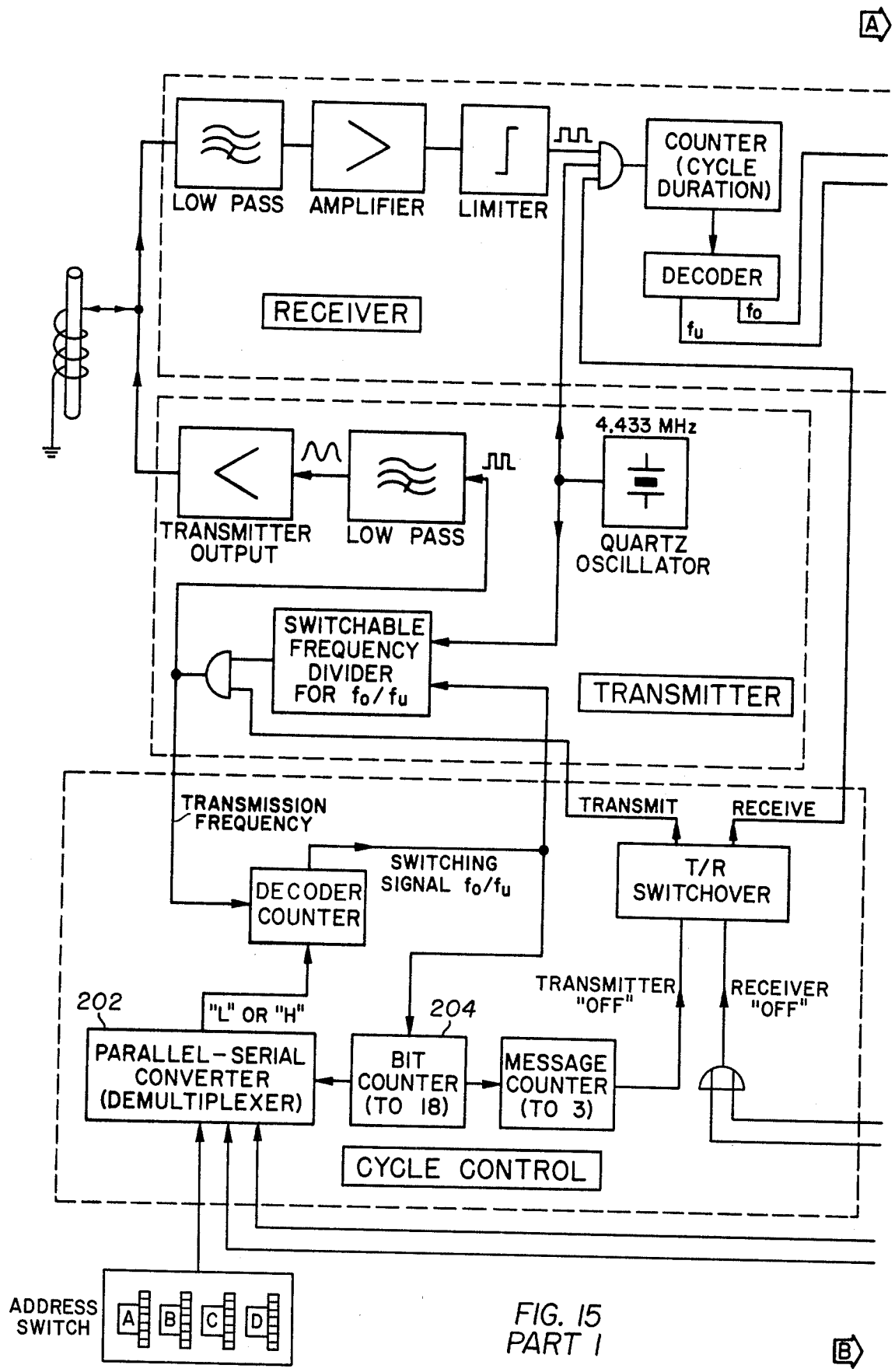
FIG. 15 PART I

PART 2

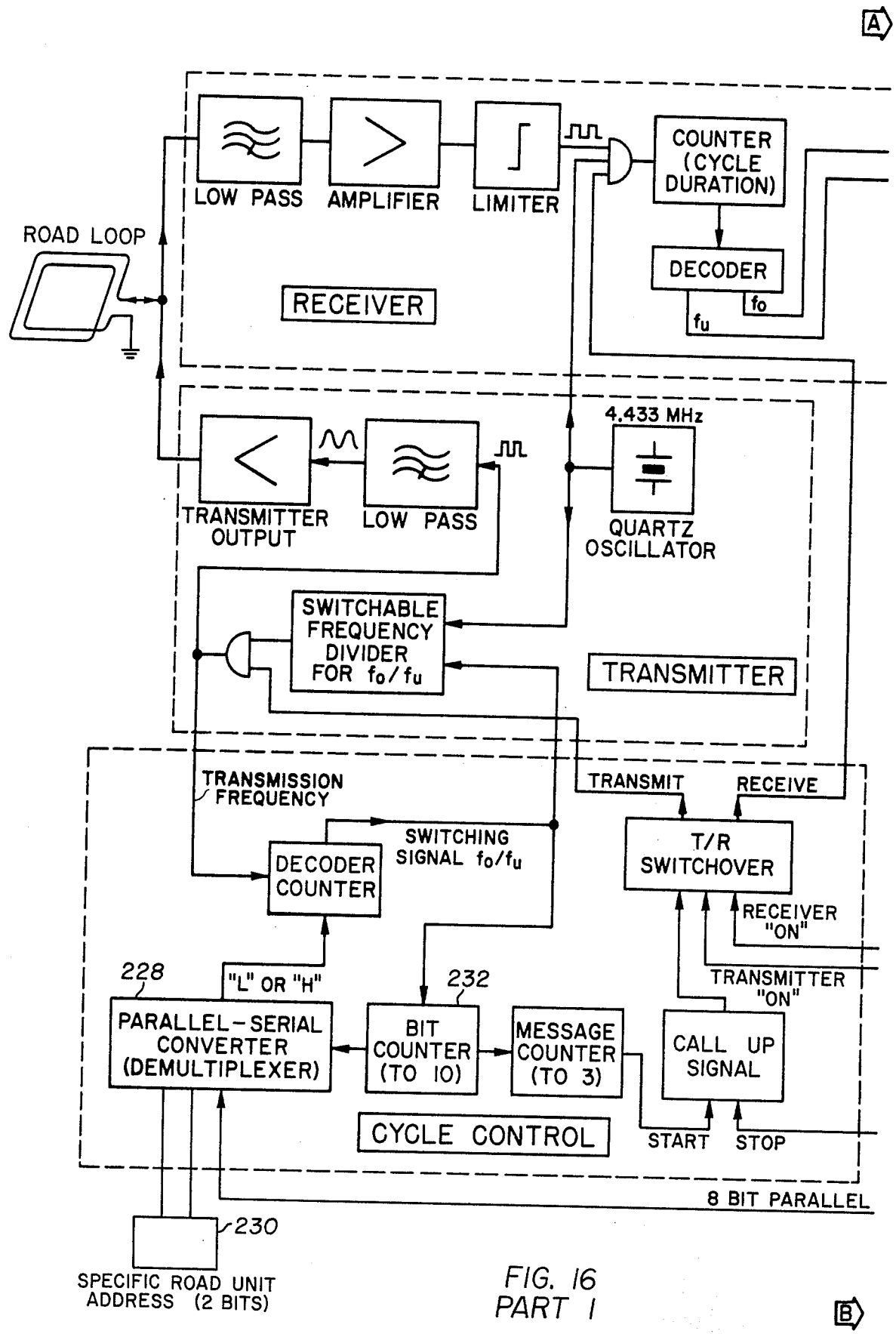
FIG. 16 PART 1

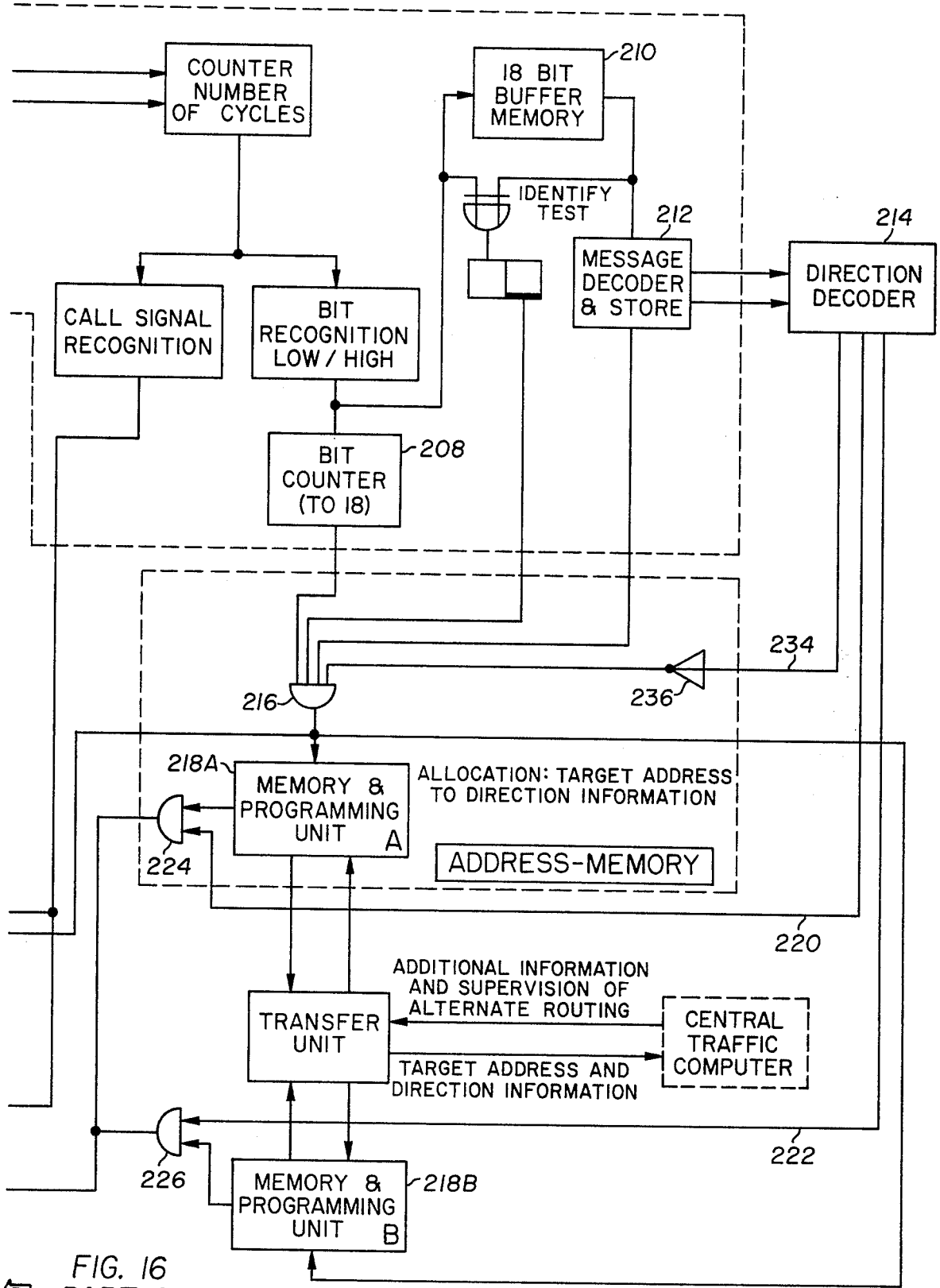
FIG. 16 PART 2

VEHICULAR DIRECTION GUIDANCE SYSTEM, PARTICULARLY FOR INTERCHANGE OF INFORMATION BETWEEN ROAD MOUNTED UNITS AND VEHICLE MOUNTED EQUIPMENT

SUBJECT MATTER OF THE INVENTION

It is an object to improve a traffic guidance system of the type described in U.S. Pat. No. 4,083,008, Eschke, assigned to the assignee of this application so that the driving direction of the vehicle can be recognized independently of the loops, and simultaneously reduce the costs by utilizing less apparatus.

Briefly, destination information when a vehicle passes an intersection is provided. Only one induction loop is provided extending over opposing lanes, coupled to a circuit arrangement for recognizing the driving direction for lanes of different driving directions.

This requires only one road installation for the two driving directions and simultaneously ensures that correct information suited for the traveller gaining his destination is transmitted to a vehicle independent of the direction of the lane on which it is moving, when the exchange of information between the road equipment and the vehicle equipment takes place.

The additional arrangement for recognizing the driving direction is extremely reliable and may be provided, according to different embodiments of the present invention, so as to constitute an additional circuit for either the road installation or the vehicle equipment. Preferably, digital circuits are utilized permitting use of integrated circuit techniques, saving both cost and space.

Figure 1:
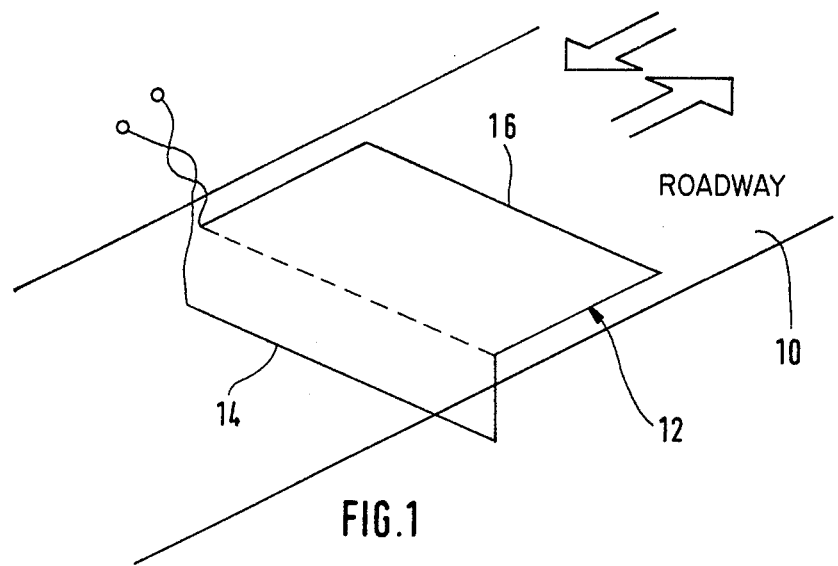
Figure 2:
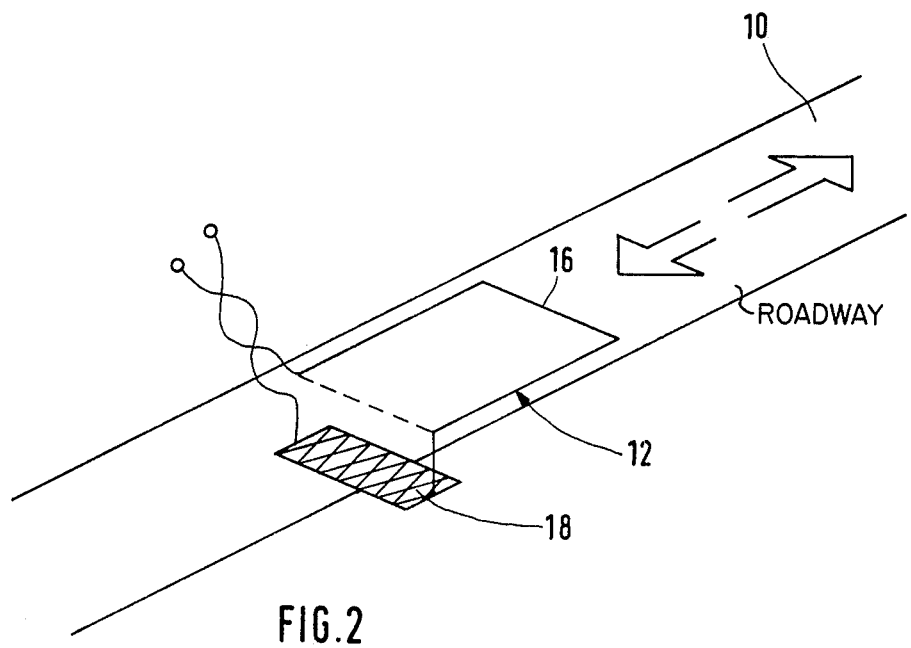
Figure 3:
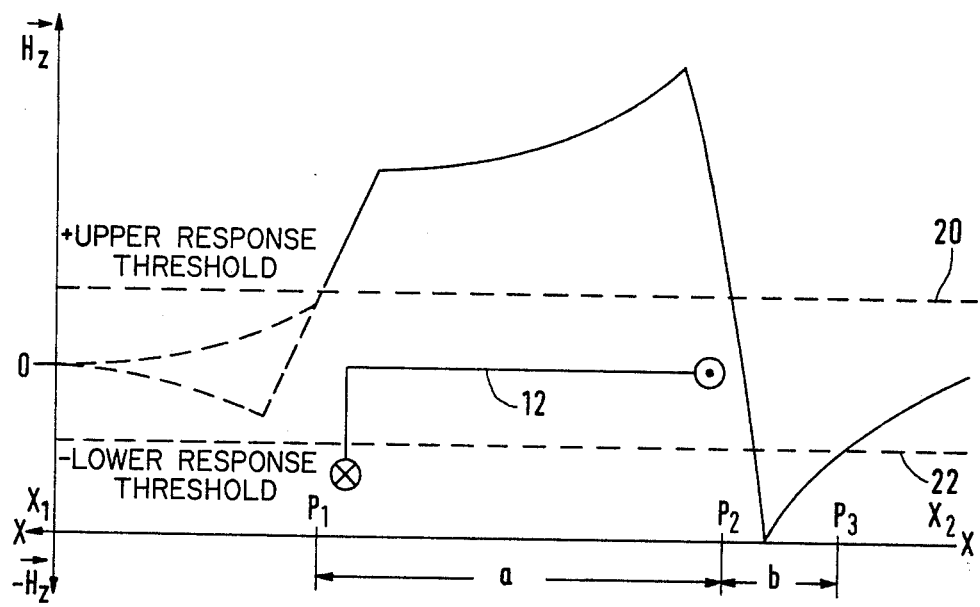
Figure 4:
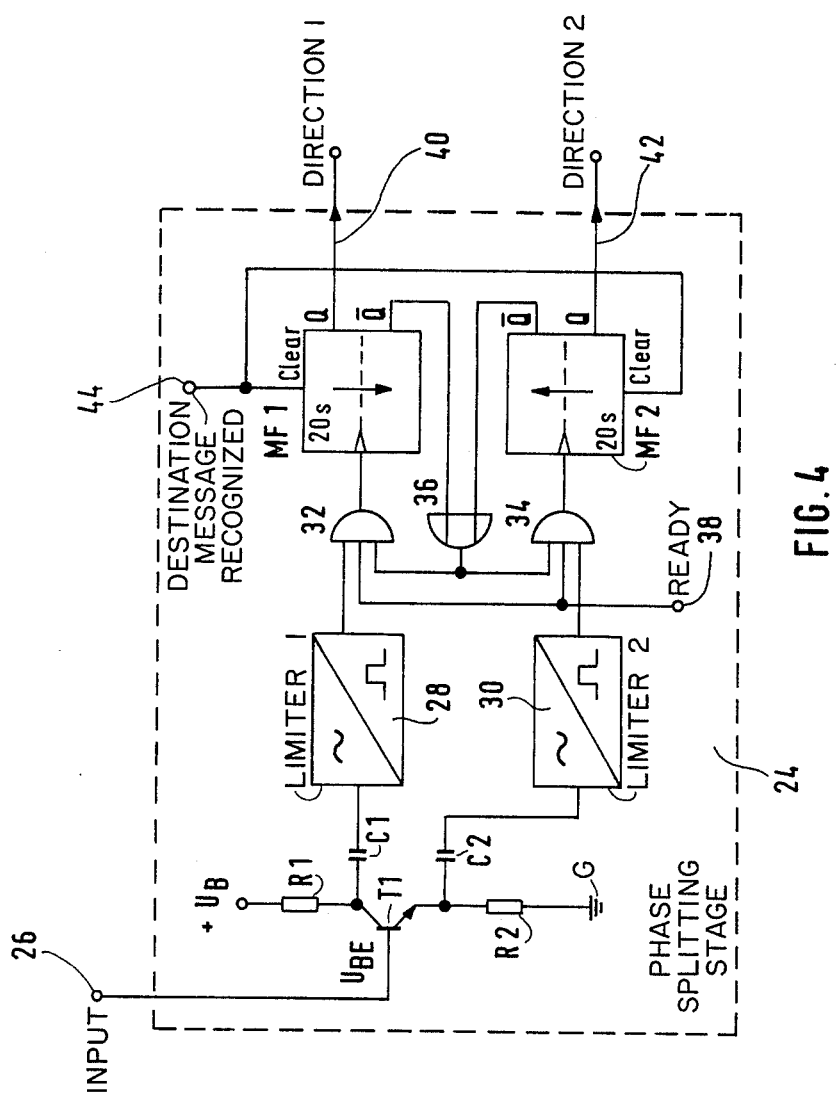
Figure 5:
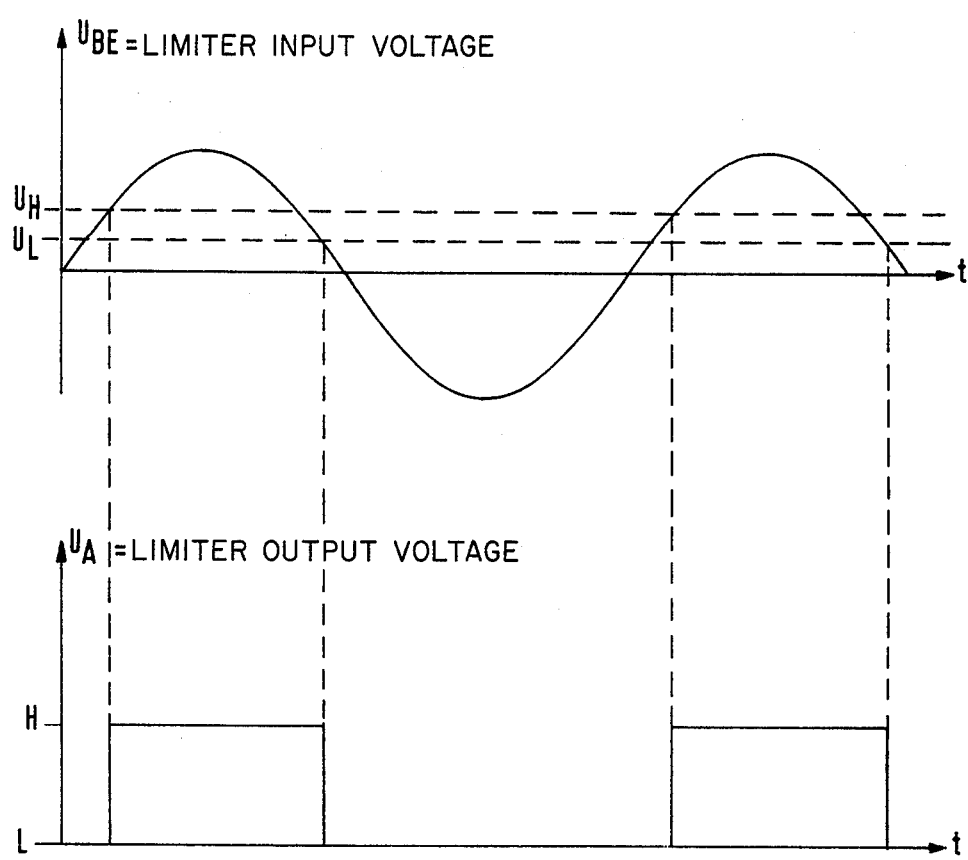
Figure 7:
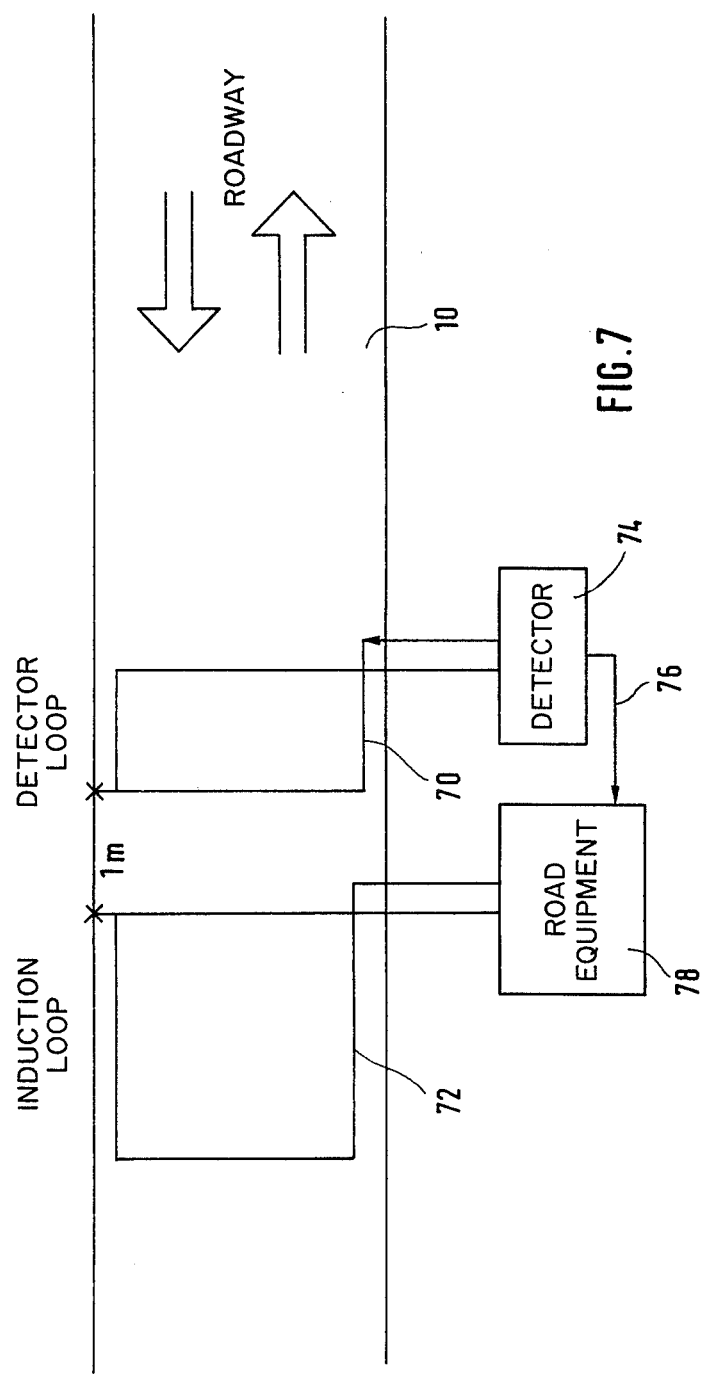
Figure 8:
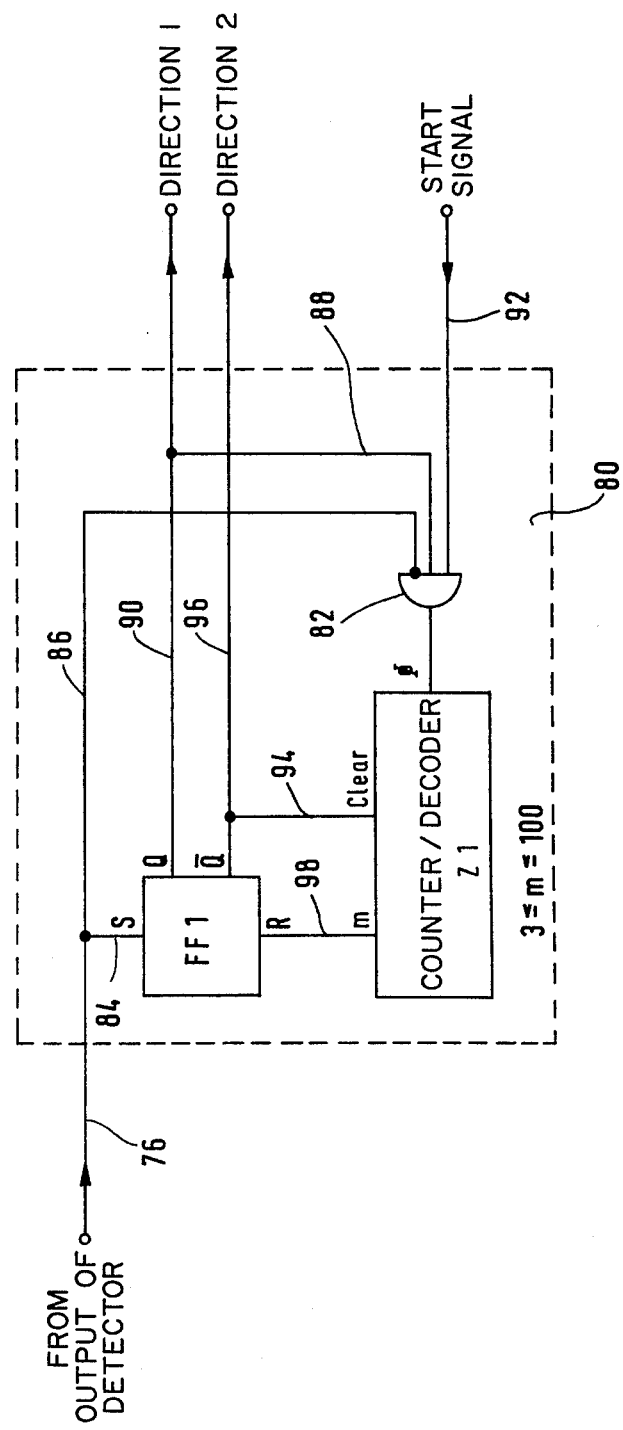
Figure 9:
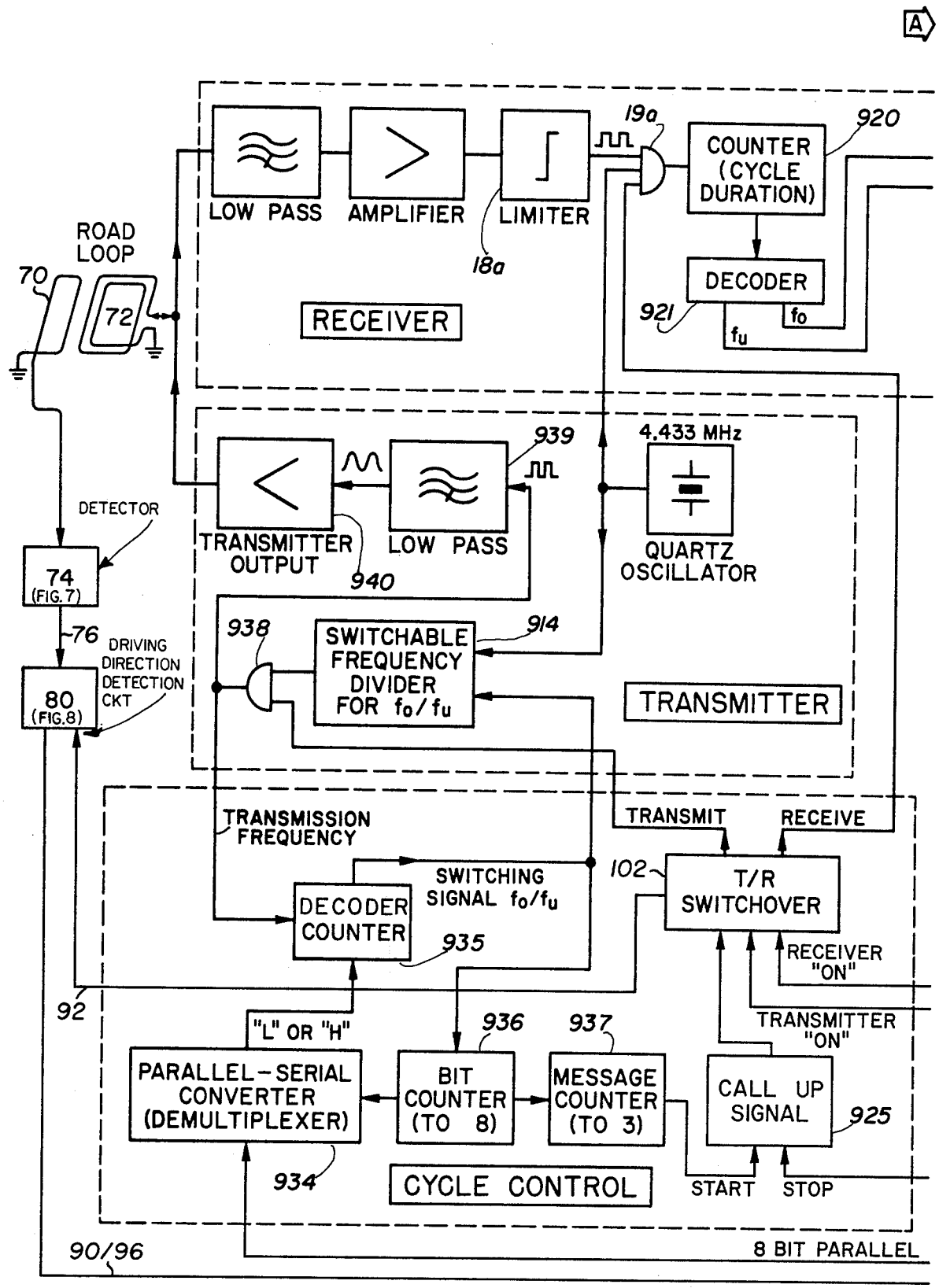
Figure 9:
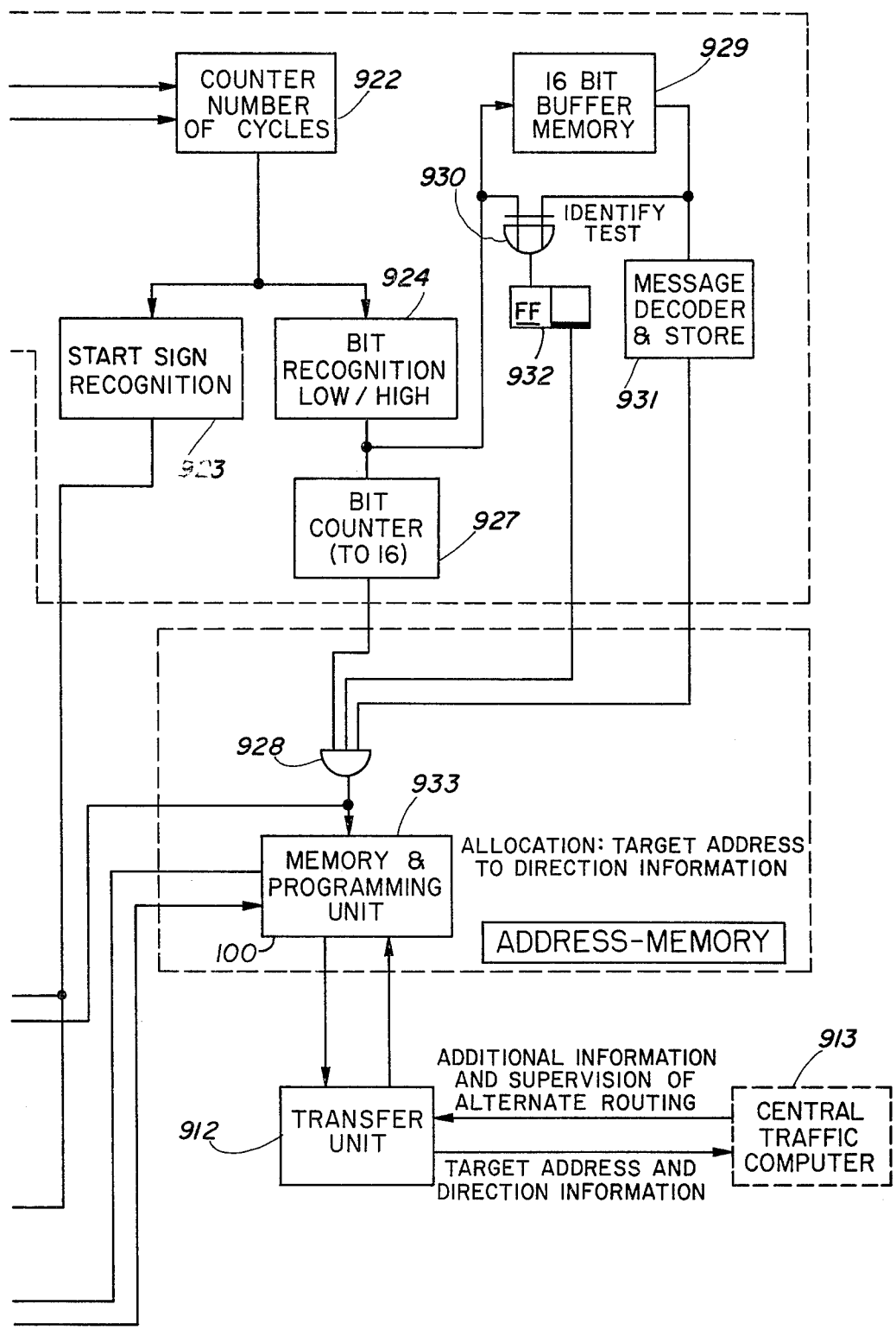
Figure 10:
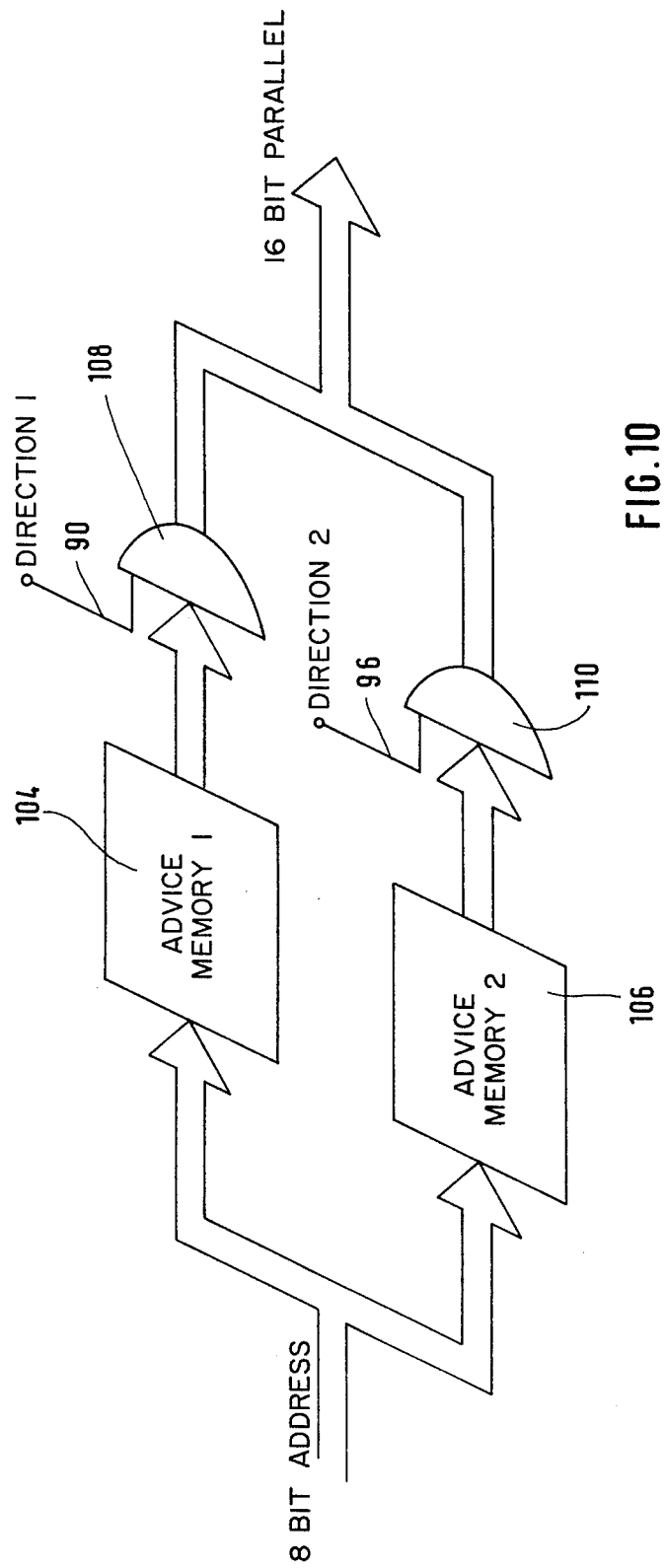
Figure 11:
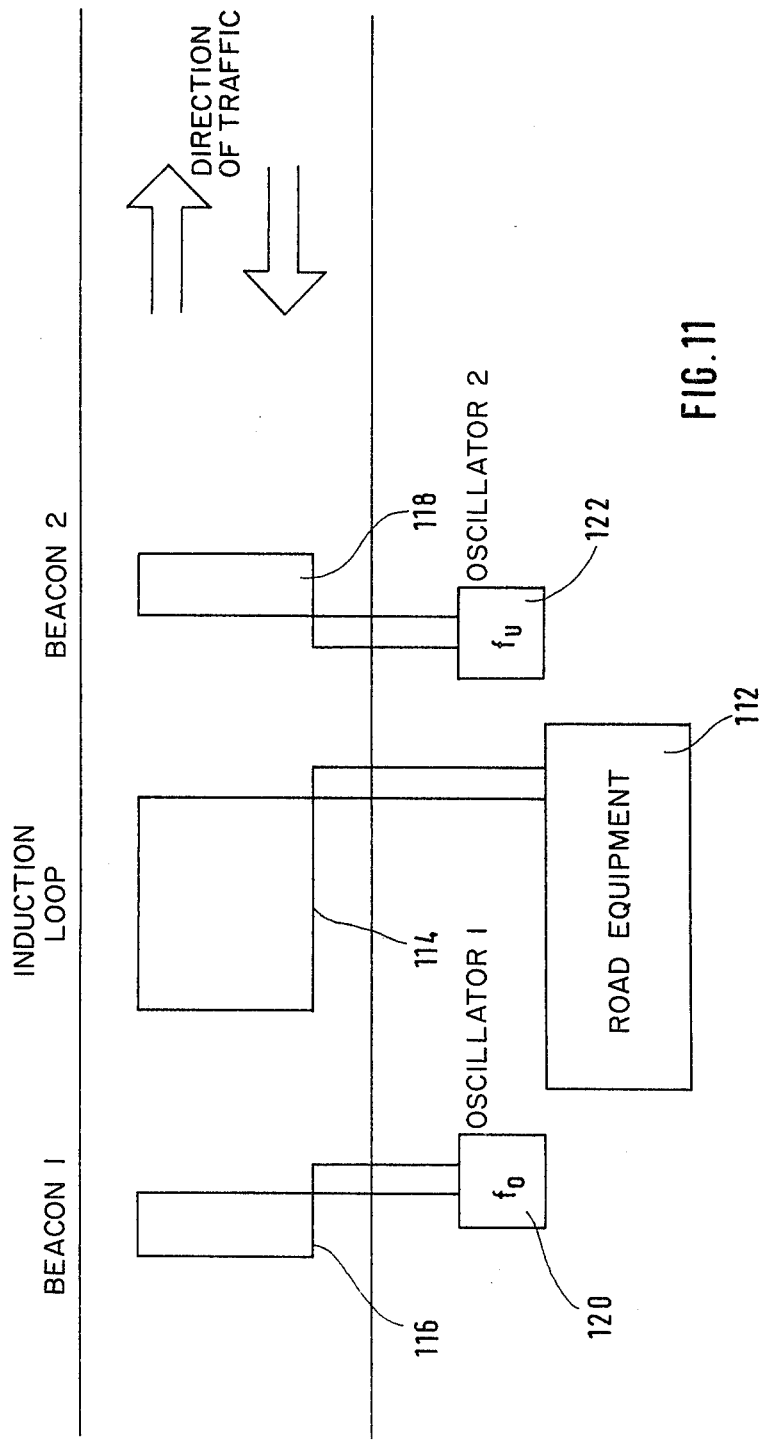
Figure 12:
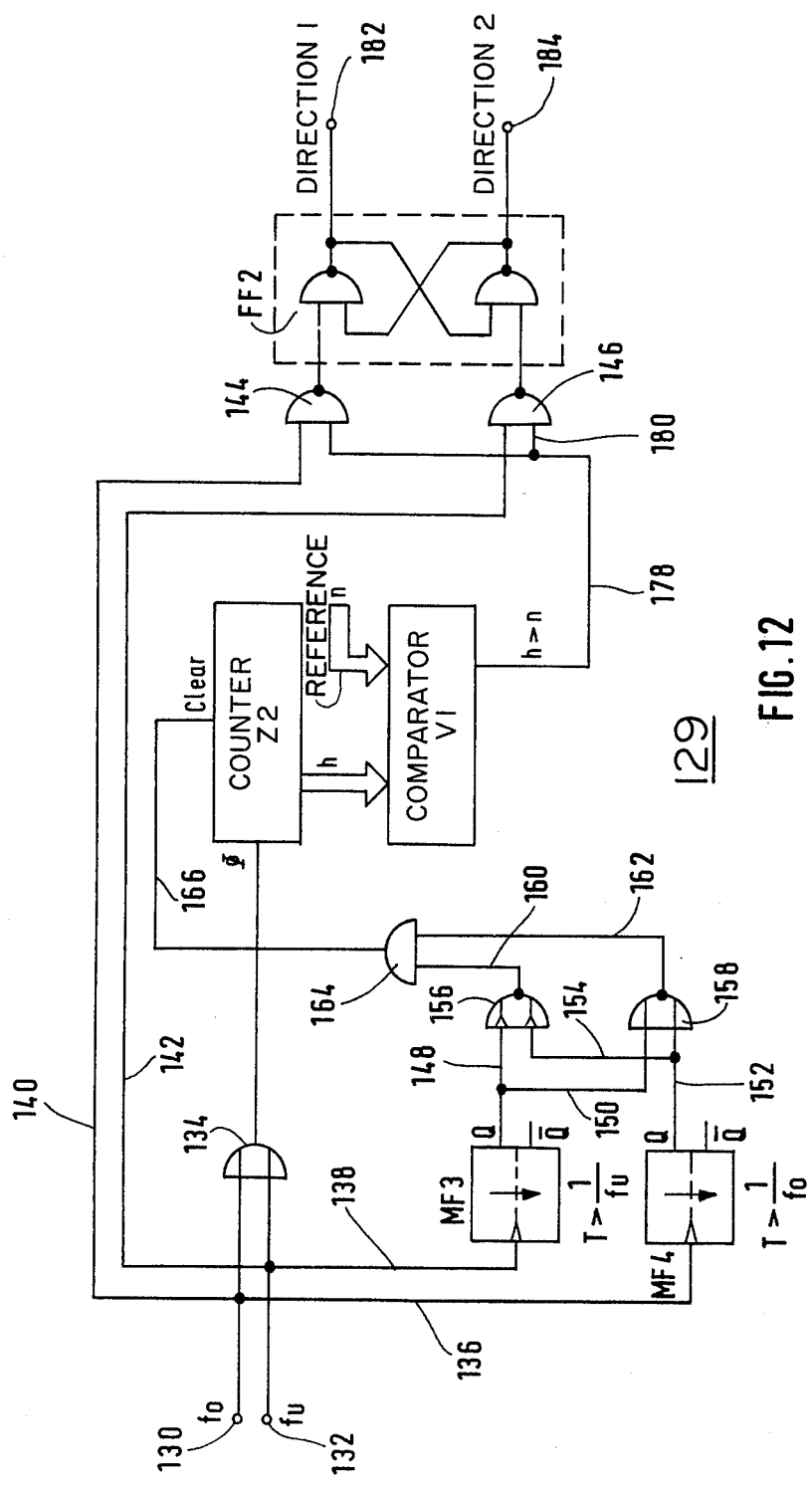
Figure 13:
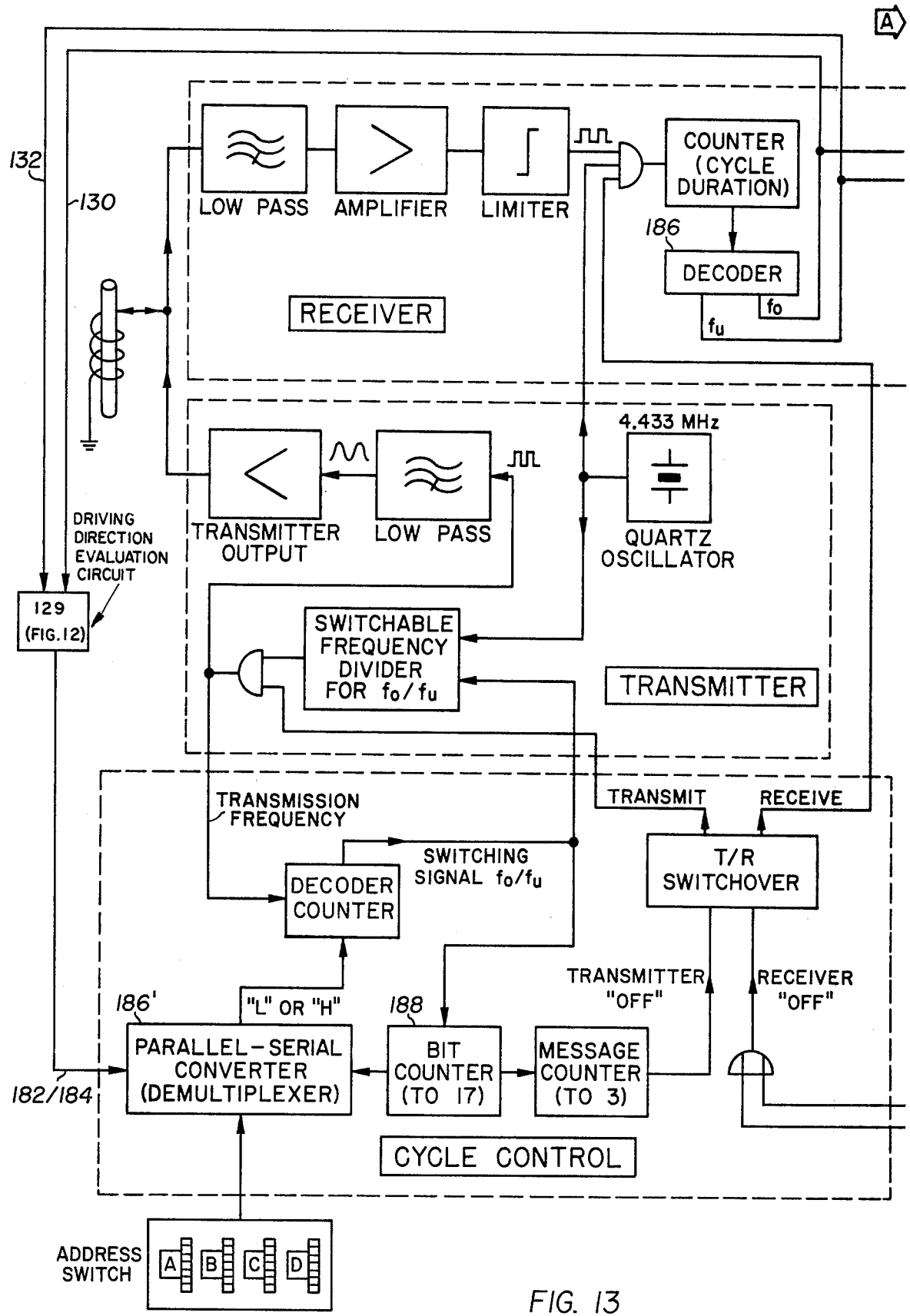
Figure 13:
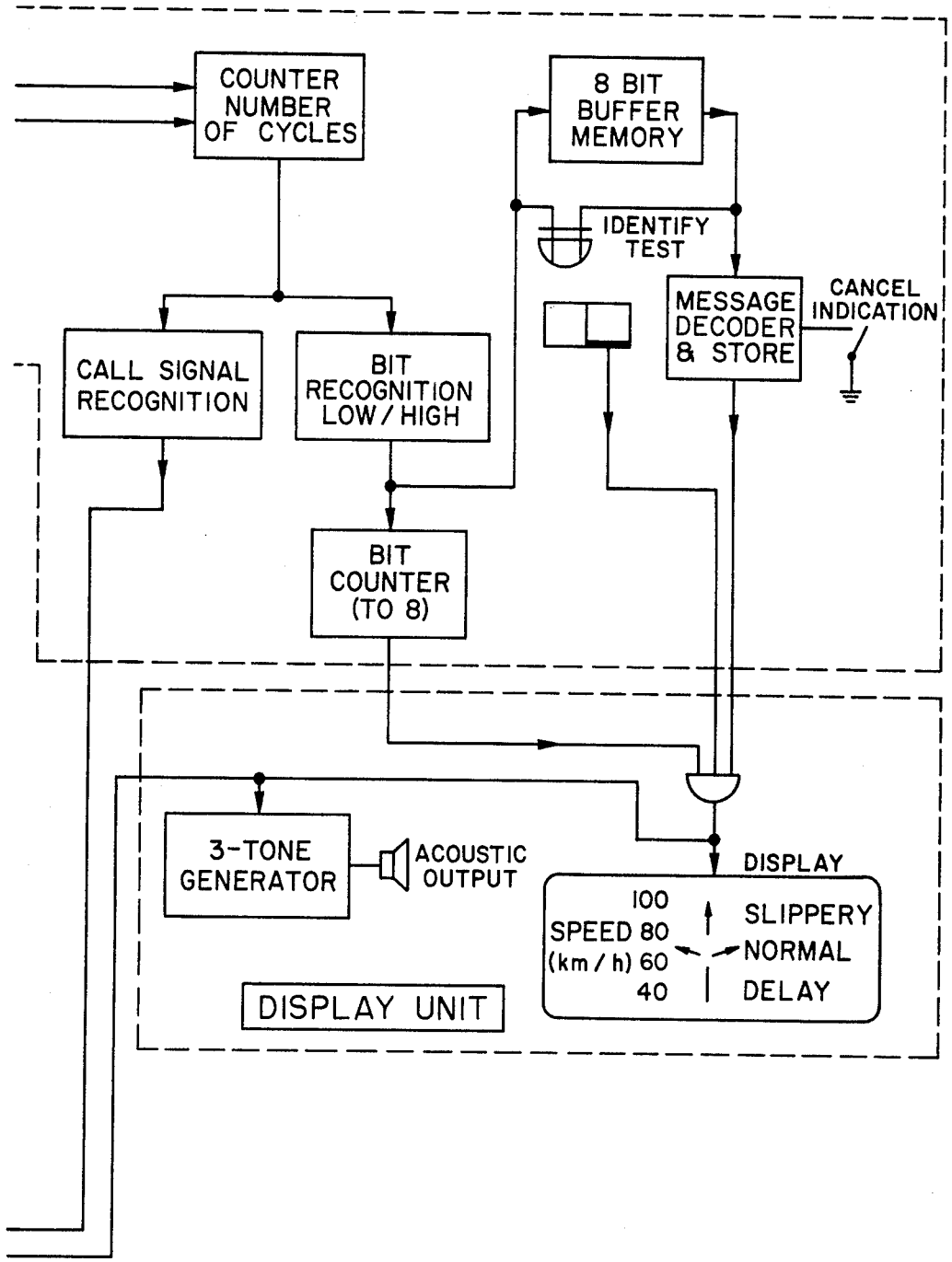
Figure 14:
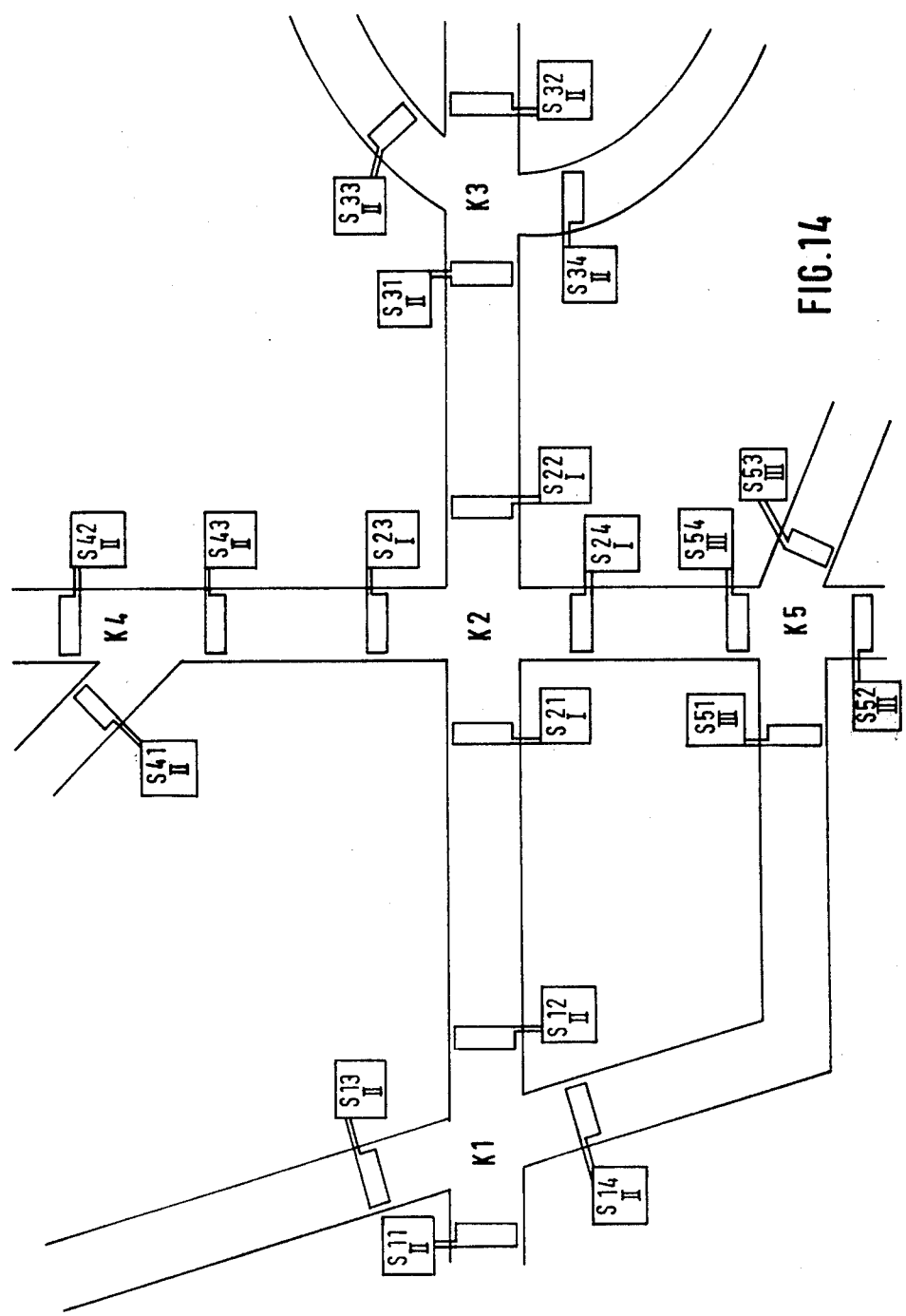

Drawings, illustrating an example:

FIG. 1 shows a loop arrangement shaped so as to be part of a traffic guidance system according to the present invention, FIG. 2 shows an induction loop according to the present invention and FIG. 1, with additional screening, FIG. 3 is a graphic representation of the amplitude of that component of the magnetic field which is perpendicular to the roadway along the length of the loop arrangement according to FIG. 1 or 2, FIG. 4 shows an accessory, or, additional circuit for recognizing the driving direction provided for in the vehicle equipment, for use with a loop arrangement according to FIG. 1 or 2, FIG. 5 is a graphic representation of the voltages occurring at the inputs and outputs of the limiters provided for in the circuit according to FIG. 4, FIG. 6 is a block diagram of a known road circuit, or apparatus, provided with an additional circuit according to FIG. 4, FIG. 7 shows a further embodiment of an arrangement of an induction loop according to the present invention and an adjacent detector loop, FIG. 8 is a basic circuit diagram of an additional circuit for recognizing the driving direction provided for in the control unit of a loop arrangement according to FIG. 7, FIG. 9 is a block diagram of a known road circuit provided with an additional circuit according to FIG. 8, FIG. 10 is a symbolic schematic illustration showing the flow of information from the driving direction recognition circuit for the purpose of selecting the memory plane assigned to the respective driving direction, FIG. 11 is a further embodiment of a loop arrangement according to the present invention provided with additional beacon-loop arrangements, FIG. 12 shows an accessory or additional arrangement in the vehicle for recognizing the driving direction in combination with a loop arrangement according to FIG. 11, FIG. 13 is a block diagram of a known vehicle equipment with an additional arrangement designed according to FIG. 12, FIG. 14 is a schematic representation of an illustrative roadway network for illustrating the mode of operation of a traffic guidance system according to the present invention provided with road equipment bearing a special identification, FIG. 15 is a block diagram of a vehicle equipment suited for use in a traffic guidance system based on the identification of the signal stations, and FIG. 16 shows an embodiment of a road equipment having special identification and intended for use in a traffic guidance system including signal stations also having special identification.

FIG. 1 is a simplified, schematic view of an induction loop 12 for both driving directions embedded in a roadway covering 10 so as to extend over the full width of the road. One of the transverse sections 14 of the loop 12 is located deeper in the road than the other section 16. The sections 14, 16 are essentially parallel.

In FIG. 2, shows an additional magnetic screen 18 for the loop section 14. When the induction loop 12 is burried as described hereinbefore, the amplitude of the magnetic field component $H_z$ in direction x of the roadway is substantially as illustrated in FIG. 3.

This means that the magnetic field component $H_z$ has a positive amplitude in the roadway section a intermediate of points $P_1$ and $P_2$ and a negative amplitude in a roadway section b intermediate of points $P_2$ and $P_3$. The sections a and b are clearly defined by an upper and a lower response thresholds 20 and 22, respectively. Zero-axis crossing phase jump, respectively, of the field pattern is not quite avoidable even by lowering and/or screening one side of the induction loop; yet, the response thresholds ensure that only the negative section b is recognizable at the other; unscreened side of the loop 12.

To clarify how the driving direction can be recognized or detected from a respective pattern of the magnetic field, first some short explanations concerning the inductive exchange of information in the traffic guidance system will be made with reference also to FIG. 6 or 13, respectively, and FIG. 9. In a known traffic guidance system, the exchange of information, during which the vehicle-mounted equipment of the system and a road equipment for such a system are reciprocally switched over between transmission and reception, is initiated by a start signal, i.e. in the present example a coded signal composed of several cycles of an upper frequency $f_o$ and following cycles of a lower frequency $f_u$.

These start signals, spaced by reception pauses, are continuously transmitted as call signs by the road equipment in its idle condition, i.e. when no exchange of information between the road equipment and a vehicle equipment takes place. During the reception intervals, a vehicle equipment may then respond to a call sign by sending out a destination address likewise initiated by a start sign.

An important feature for the identification of the driving direction by means of an induction loop buried in the roadway according to FIG. 1 or 2, respectively, consists in that a vehicle travelling, for example, from point $x_1$ to $x_2$ (FIG. 3) first detects a positive amplitude and, after a zero-axis crossing, that is, intermediate the upper and a lower response threshold 20 or 22, respectively, senses a negative amplitude of the field pattern. A vehicle driving in opposite direction from $x_2$ to $x_1$ recognizes this field pattern in reversed order.

According to a further feature of the present invention, the identification of the driving direction of the vehicle by the vehicle-mounted, on-board equipment is sensed this way: a start signal picked up by a vehicle equipment within one of the ranges a, b always starts with a positive half-wave and ends with a negative half-wave; the same start signal appears in antiphase in the respective other field range, i.e. it starts with a negative half-wave and ends with a positive half-wave, due to the phase reversal in the field pattern. According to the present invention, this is achieved, e.g., by suitable control circuits and/or the sense of winding of the loop or the coil of a ferrite rod. An advantageous and simple circuit arrangement 24 according to the present invention and suited for recognizing the driving direction by evaluating the call signs received in antiphase relation-depending upon the respective driving direction is illustrated in FIG. 4.

The call signs appearing at an input 26 (FIGS. 4 and 6) are applied to the base of the transistor T1 constituting together with resistors R1 and R2 a phase splitter connected intermediate a d.c. voltage source $U_B$ and ground or reference G. The antiphase collector output of this phase splitter is connected to the input of a first limiter 28 through a coupling capacitor C1, whereas the inphase emitter output is coupled to the input of a second limiter 30 through a coupling capacitor C2. The response thresholds 20, 22, of FIG. 3 show the minimum field strength necessary for the input voltage required at the limiter inputs to ensure the correct identification of driving direction.

The outputs of the limiters 28 and 30 can be switched each to the input of one of two subsequent monostable flip flops (MFF) MF1 and MF2 by means of a digital branch circuit comprising AND gates 32, 34, and OR gate 36, the MFF's are not set when in their idle condition.

Operation, with reference also to FIG. 5: The limiters assume the output condition L ("Low"), represented in the present example by 0 volt, upon occurrence of a negative half-wave of the input voltage; and the condition H ("High"), represented by a d.c. voltage $U_B$, upon occurrence of an incoming positive half-wave.

When a start signal beginning with a positive half-wave is present at the input 26 of the circuit 24, the first signal change from the signal condition L to the signal condition H occurs at the output of the second limiter 30.

It has already been mentioned that the two MFF's MF1 and MF2 are not set during the idle condition of the circuit 24; thus a signal condition H is present at the output $\bar{Q}$. Furthermore, an H-signal will be present at the "receiver on" or "ready"-input 38. A further H-signal is supplied from the output of the gate 36 through which the $\bar{Q}$-outputs of the monostable multivibrator are interconnected.

Consequently, upon appearance of a start signal beginning with a positive half-wave, the MFF monostable multivibrator MF2 switches over by the output signal of the second limiter 30 to produce an H-signal at the output Q and on output drive 42 of the MFF MF2.

Correspondingly, upon appearance of a start signal beginning with a negative half-wave, the output Q and drive 40 of the MFF MF1 will assume the H-condition for the preset on-time.

According to a feature of the present invention, the on-time or unstable time of the MFF's is chosen so as to be longer than the time a vehicle will normally stay within the range of an induction loop. During the on-time of a MFF, the OR-gate 36 and, consequently, the two AND-gates 32 and 34, are blocked, which means that the inputs to both MFF's are blocked with respect to signals applied by the limiters 28 and 30, during the on-time of any one MFF.

In dependence on whether a start signal begins with a positive or negative half-wave, is assigned to section a or b, respectively, of the field configuration according to FIG. 3, the signal H appearing at one of the Q outputs 40 or 42 clearly indicates which section has first been crossed by the vehicle, and, consequently, the direction in which the vehicle is moving.

Upon recognition of the destination message transmitted by the vehicle equipment to the road equipment, the latter is switched over to the operating condition "transmission" and the vehicle equipment to the operating condition "reception". According to a further embodiment of the present invention, the two MFF's are reset, immediately after the information exchange has taken place, by means of a control signal then appearing at the "message recognized"-input 44 of the circuit 24. The resetting of the MFF's has the advantage that the spacing between induction signals from succeeding loops can be chosen smaller than it would be possible with only automatic resetting of the monostable multivibrators. Furthermore, according to a feature of the present invention, the "ready"-input 38, after exchange of information, will be in the signal condition Low, or 0 for the remaining time the vehicle traverses the loop, and, thereby will block both AND-gates 32 and 34 for further signals from the limiters. This is highly advantageous, in particular when a vehicle is forced to stay in the range of the induction loop for a longer time.

The block diagram represented in FIG. 6 illustrates an additional or accessory circuit for use with the driving direction recognition circuit 24 according to FIG. 4 for incorporation in an already known vehicle equipment, the simplified represented signal-feeder lines, necessitated when incorporating the additional circuit, bearing the same reference numerals as the terminals in FIG. 4.

As is illustrated in FIG. 6, the signals received by a ferrite antenna 46 are applied through a filter network 48, which may be a band-pass filter instead of the illustrated low-pass filter, to an amplifier 50, the output of which is connected for further processing of the signals to the additional circuit 24 through a line 26. The outputs 40 and 42, where the detected data concerning the driving direction of the vehicle appear, are fed to the parallel-serial-converter or demultiplexer 52, and thus added to the destination message provided by the address switch unit 54. A destination message that can be set at the address switch unit 54 comprises 16 bits, and, therefore, the bit counter 56 has to be designed for 18 bits to be capable of receiving in addition the two possible signals identifying the driving direction of the vehicle.

For the same reason, the described embodiment of the present invention necessitates a bit counter, in the road equipments, which has to be extended by 2 bits, i.e. from 16 to 18 bits.

The further elements of the equipment to FIG. 6 are clear from the legends of the block diagram. The equipment has already been described, for example in German Disclosure Document DE-OS No. 25 15 660.

Referring to FIG. 6: The signal received by the antenna 46, filtered in filter 48 and amplified in amplifier 50, is applied to a limiter 18a, which puts the signal into rectangular form with TTL levels, to an AND-gate 19a, the output of which is supplied to a counter 620 by which the frequencies $f_u$ and $f_o$ are detected by a period measurement made as follows. The resonance frequency of the oscillator 615, which is supplied to one input of the AND-gate 19a, acts as the counting frequency. A decoder 621 of the counter 620 delivers a single pulse for each period detected, the pulse being delivered at one output if it is a period of the frequency $f_u$ and at the other output if it is a period of the frequency $f_o$. The pulses are counted for each frequency in the period counter 622, the output of which is supplied to period counter 622 and then into a call sign recognition circuit 641. From the latter a signal will be provided to one input of an OR-gate 642 the output of which is connected with the change-over circuit 626. The change-over circuit 626 produces a switching out of the receiver and a simultaneous switching on of the transmitter.

A destination address is set into the address switching unit 54, which provides 16 bits to the parallel serial converter 52. A destination message is then sent by the vehicle equipment in the same way that an advice message is sent by the road equipment. The cycle control of the vehicle equipment (FIG. 6) differs from the corresponding cycle control of the road equipment (FIG. 9) only in that the bit counter 56 is designed for 16 bits and the output of the message counter 637 is connected directly with an input of the changeover circuit 626. A call sign sequence circuit 925 (FIG. 9) is, in the receiver, in this case omitted. After the transmission of a destination message three times, the message counter 637 switches off the transmitter through the change-over circuit 626, the receiver being switched into the circuit at the same time for a period at least long enough for receiving three transmissions of a message, so that an advice message of the road equipment can be received.

The transmitter of the vehicle equipment is identical with the transmitter of the road equipment.

When the vehicle equipment receives an advice message from the road equipment, which message, as already explained consists of eight bits and is transmitted three times in succession, the message proceeds to the bit recognition circuit 624 where the information is reconstituted in the form of "LOW" and "HIGH" conditions. The output signal of the bit recognition circuit 624 is evaluated in the same manner as in the road equipment up to the AND-gate 628. In this case a bit counter 644 designed for only eight bits and a buffer store 645 likewise for eight bits as well as an 8-bit storage circuit 646 are provided.

As soon as two successive transmissions of an advice message are recognized as being identical, the message content is delivered over the output of an AND-gate 628 to an indicator device 647 for optical display. If the advice message, for example, has the directional advice "LEFT" and the additional warning "FOG", then in the display field 647 of the indicator the left-directed arrow and the legend "FOG" will be caused to light up by the decoding of the message in the device 647. The decoding operation can be carried on in the storage device 646, if desired, in which case the AND-gate 628 becomes an array of AND-gates for delivering the decoded signals to the respective symbols of the device 647 for their selective illumination.

A 3-tone generator 648 is also operated by the AND-gate 628 to indicate acoustically the reception of an advice message. After the completion of the reception of the advice message, the receiver of the vehicle equipment is turned off by the change-over circuit 626 in response to a signal over a connection from the output of the AND-gate 628 passing through one of the inputs of the OR-gate 642.

As a rule the indications on the display field 647 remain until a new information exchange between the vehicle equipment and another road equipment takes place. The display can be extinguished earlier by hand, if desired, by operating a switch 650 that erases the message in the storage circuit 646.

The road equipment (FIG. 9), is similar in many respects; similar elements have been given reference numerals starting with 9 (900 series), rather than 6, as in FIG. 6. The output of counter 922 is supplied to a start signal recognition circuit 923 that recognizes a start sign as soon as it is present and, also to a bit recognition circuit 924 that distinguishes the "LOW" and "HIGH" information of the message bits.

As soon as the start sign recognition circuit 923 recognizes a start sign which a vehicle has transmitted, the circuit 923 interrupts the sequence of call signs transmitted by the road equipment by providing a signal to the call sign sequence circuit 925 and operates the send-receive change-over circuit 102 by providing the same signal to the "receiver on" input of the circuit 926. The circuit 925 and 102 form part of the cycle control component of the road equipment. The receiver of the road equipment now remains turned on long enough to receive the distination address of the vehicle three times.

The 16-bit destination address is, as already mentioned, sent three times by the vehicle. When it is received in the road equipment, the bit recognition circuit 924 provides a signal on the one hand through a bit counter 927 to an input of an AND-gate 928 and, on the other hand, to a shift register serving as a 16-bit butter store 929 and to one input of an exclusive OR-gate 930. The output of the 16-bit buffer store 929 is connected to a second input of the exclusive-OR-gate 930 and with a storage circuit 931. The output of the exclusive-OR-gate 930 is connected to a flip-flop 932. The outputs of the flip-flop 932 and of the storage circuit 931 are connected to further inputs of the AND-gate 928. As soon as the bit counter 927 has counted to 16 and two successive messages contained in the signal have been found identical, the message content of the storage circuit 931 is passed on and the destination address contained in the message is provided over the AND-gate 928 to a storage and programming circuit 933.

The storage in programming unit 933 is so constituted that the arriving destination addresses are used to sort out the corresponding directional recommendations and the like. As soon as the distination address has been ascertained, the change-over circuit 102 is given an order by the output of AND-gate 928 received at one input of the change over circuit 102 that changes over the road equipment from the receiving to the sending condition.

The directional recommendation related to the destination address received, together with supplemental information that may be available is provided by the storage and programming unit 933 to parallel-series converters 934, which may be regarded as a demultiplexer, so that room will be made in the storage and programming unit 633 for new recommendations which may be received from the central traffic computer 913 over the transfer unit 912. Telephone lines already present along expressways and other highways can be used as transmission lines connecting the input-unit 912 and the central trafic data processing system 913.

The advice message communicated to the parallel-series converter 934 is an 8-bit message and is composed as follows: two bits for a directional recommendation, and one additional bit. Out of the eight possibilities of these three bits are built up codes for directional indication without supplementary indication and for directional indication with the supplementary indication "destination still ahead", "destination reached" or "wrong direction"; two bits for a recommended speed, two bits for a road condition announcement and one bit not yet assigned.

In its idle condition, which is to say when no exchange of information with a vehicle is taking place, the road equipment continually sends call signs spaced by reception pauses during which a vehicle having received a call sign can answer. The transmission of the call signs as well as the sending of advice messages is controlled by the cycle control circuit. It consists essentially of the call sign sequence circuit 925, the change-over circuit 102, the parallel-serial converter 934, a coding counter 935, a bit counter 936 and a message counter 937.

The call sign sequence circuit 925 makes sure that during the coding of a call sign the transmitter of the road equipment remains turned on and that after the transmission the receiver is switched on for a short time. The message counter 937 makes the necessary provisions for repeating three times the sending of a message consisting of a start sign and the information present in the parallel-sequential converter 934.

The eight bits of the advice message are supplied in parallel to the parallel-sequential converter 934 and are called out sequentially by the bit counter 936 so as to be supplied as "LOW" or "HIGH" conditions in an input of the coding counter 935. The latter undertakes the conversion of these conditions into the corresponding number of periods of the frequencies $f_u$ and $f_o$ as the counter advances at the frequency-divider output frequency. After having reached the necessary number of periods of the transmitted frequency $f_u$ for the "LOW" or "HIGH" condition as the case may be, the coding counter 935 supplies a switch-over signal to the frequency-switchable frequency divider 914 belonging to the transmitter so that further transmission is at the frequency $f_o$ again for the correct number of periods, taking account of further frequency division occurring in the wave converter or filter 939.

The frequency-shifted message pulses of the kind described in the description of the communications system accordingly appear at the output of the frequency-switchable frequency divider 914. These square waves are supplied to the input of an AND-gate 938, the second input of which is connected to the change-over circuit 102. The second output of the change-over circuit 102 is connected to the input of an AND-gate 19a.

The square waves are then converted into sinusoidal waves and amplified, and this is symbolically represented in FIG. 1 in wave converter 939 and an amplifier 940, the latter feeding the buried road loop 72.

FIG. 7 illustrates a schematic loop arrangement intended for use with a further embodiment of a driving direction recognition circuit according to the present invention.

In this example, a detector loop 70 is buried in the roadway 10, so as to be located at a small distance from an induction loop 72 and side-by-side thereto with respect to the driving direction. The detector loop 70 is connected to a detector 74; a connection line 76 leads from this detector 74 to the road equipment 78 for the induction loop 72.

Loop detectors consisting of an induction loop and a detector circuit are utilized for example to control traffic lights, and provide a pulse, when a vehicle moves thereover. Instead of inductively operating loop detectors light gates, pressure tubes, or the like, can be utilized.

If, according to FIG. 7, a loop detector is disposed side-by-side with an induction loop to carry out information exchange according to the present invention, information on the driving direction to be fed into the road equipment can be obtained in an additional recognition circuit by the detector responding, in dependence upon the driving direction, either before or after the exchange of information according to the present invention.

A basic circuit for an evaluating circuit for providing the respective information of the driving direction is illustrated in FIG. 8 in block diagram form. This circuit arrangement 80 substantially consists of a bistable flip-flop FF1, a counter and a decoder Z1, and an AND-circuit 82. The output of the detector 74, see FIG. 7, is connected to both the set input S of the bistable flip-flop FF1 and the inverting input of the AND-gate 82 by branch lines 84 and 86.

The Q-output of the flip-flop FF1 is connected to a further input of the AND-gate over a line 88 branching off the outgoing line 90 for delivering information on the driving direction. Start signals supplied by the road equipment are utilized as call signals and applied to the third input of the AND-gate through a lead 92. The clear-input to reset the counter and decoder Z1 is coupled to the Q-output of the flip-flop FF1 over a line 94 branching off the outgoing line 96 for the second driving direction. A line 98 leads from the m-output of the counter and decoder Z1 to the reset input of the bistable flip-flop FF1.

The bistable flip-flop FF1 is in its idle condition, i.e., not set, so that the counter Z1 is cleared.

Operation: The loop detector according to this embodiment of the invention operates passively. When a vehicle moves over the detector loop, the signal at the detector output 76 is converted from the signal condition, L or 0 to the condition H, or 1 and this condition is maintained as long as the vehicle is to be found above the detector loop.

If a vehicle traverses the detector loop before it moves over the induction loop, the bistable flip-flop FF1 is set through line 84, which is caused by the conversion of the detector output signal from the condition L to H. Simultaneously, the signal H present at the detector output blocks the AND-gate 82 through line 86, thus effecting that no call signals are applied to the counter Z1 through the line 92. The input of the counter stays blocked with respect to incoming call signals, until the detector output returns to the level L.

According to a feature of the present invention, the distance between the detector loop and the induction loop is selected to be smaller than the minimum possible length of a vehicle, to the front of which the ferrite rod 46 (FIG. 6) of the vehicle equipment is attached. In FIG. 7, the distance between the loops is, for instance, of the order of one meter.

Consequently, the ferrite rod secured to the front of a vehicle will either be still in the range of the induction loop or will already have left this range when the detector output returns to the level L, if the distance between the loops is chosen according to this feature of the invention. Accordingly, the exchange of information will either have already been started or finished, when the detector output changes back from the condition H to the condition L. As a result, the signal H, indicating that the car runs in the driving direction 1, will be present at the output Q of the flip-flop FF1, and delivered by the outgoing line 90.

After the vehicle has moved over the detector loop 70 (FIG. 7) and the exchange of information has been finished, the start signals transmitted by the road equipment are applied through the then open AND-gate 82 to the counter Z1 at the m-output of which an H-signal, upon a pre-determinable number (m) of received start signals, will appear as soon as the decoder of the counter Z1 detects the corresponding count (m) of the counter. This signal is fed through the line 98 to the reset input of the bistable flip-flop FF1 returning it thereupon to its initial condition. The signal appearing in this condition at the $\overline{Q}$-output resets or clears the counter through the line 94.

Consequently, when a vehicle moves over the induction loop 72 of the vehicle equipment before it runs over the detector loop 70, the signal at the detector output can change from the condition L to the condition H only after preceding information exchange between road equipment and vehicle equipment. This means that the output Q of the bistable flip-flop FF1 has the value L as far as this driving direction 1 is concerned, whereas the signal H existing at the output $\overline{Q}$ serves as an indication for the driving direction 2, and is delivered through the line 96.

After leaving the induction loop 72, the vehicle moves over the detector loop 70, thus causing the bistable flip-flop FF1, according to the above explanations, to be set. This fact, however, is unimportant, since it does not influence the already accomplished exchange of information. The flip-flop FF1 is reset by the start signs, now anew supplied to the counter Z1 via the AND-gate 82. Consequently, the evaluating circuit will have returned to its initial condition before the subsequent induction loop is reached.

FIG. 9 shows a simplified representation of how to complete a presently available road equipment, by the above-described arrangement for recognizing the driving direction of a vehicle.

Information on the driving direction of the vehicle is supplied by the output of the evaluating circuit according to FIG. 8; it is directly fed into the storage circuit 100 of the road equipment, where it clears, depending upon the detected driving direction, one of two memory planes, as explained below with reference to FIG. 10.

The start signals are supplied by the unit 102 for changing over between transmitting and receiving condition.

The coupling of the loop detector to the additional circuit 80 of the road equipment has already been explained hereinbefore, see the description of FIG. 7.

FIG. 10 shows schematically the memory 100 of the road equipment, which comprises a separate advice memories 104 or 106, one for each driving direction. The output of the first advice memory 104 is connected to an input of an AND-gate 108, the second input of which is connected to the outgoing line 90 for the signal indicating the first driving direction. The output of the second advice memory 106 is connected to an input of a subsequent AND-gate 110, the other input of which is coupled to the outgoing line 96 for signals indicating the second driving direction, this outgoing line 96 coming from the additional circuit 80. Thus, it is in a very simple way ensured that only that piece of advice is transmitted from the road equipment to a vehicle equipment that is commanded by the direction indicating signal obtained from the driving direction of the vehicle.

FIG. 11 shows a loop arrangement according to a further embodiment of the present invention, in which beacon loops 116, 118 are each disposed before and after—with respect to the direction of the roadway—an induction loop 114 associated with a road equipment 112.

Both beacons send out continuous oscillations on one of the frequencies utilized in the system according to the present invention, one definite frequency each being assigned to each beacon.

The first beacon 116 is, e.g., connected to a first oscillator 120 oscillating on an upper frequency $f_o$, and the second beacon 118 is coupled to a second oscillator 122 oscillating on a lower frequency $f_u$.

This loop arrangement permits the recognition of the driving direction in the vehicle equipment by means of an evaluation circuit 129 (FIG. 13) shown in detail in the block diagram in FIG. 12.

An input 130 (FIG. 12) is provided for the upper frequency $f_o$ and an input 132 for the lower frequency $f_u$. The inputs 130 and 132 can alternately be connected to the input of a counter Z2 through an OR-gate 134, and are furthermore connected to respective monostable FF's MF3 and MF4 through branch lines 136 and 138, and to one input each of NAND-gates 144 or 146, respectively, through branch lines 140 or 142.

The on-time of the MFF MF3 triggered by the lower frequency $f_u$ is chosen to be longer than the period of the frequency $f_u$. The on-time of the MFF MF4 triggered by the upper frequency $f_o$ is chosen to be longer than the period of the upper frequency.

Both the Q-output of the MFF MF3 and the Q-output of the MFF MF4 are connected to one of the dynamic inputs of a NOR-gate 156 each and to an input of a further NOR-gate 158 each, the Q-output of the monostable multivibrator MF3 through lines 148 and 150 and the Q-output of the monostable multivibrator MF4 through lines 152 and 154. The lines 160 and 162 from the gates 156 and 158 lead to an AND-gate 164, the outgoing line 166 of which is connected to the clear-input of the counter Z2.

A counter output bearing the reference letter h is coupled to a comparator V1, the reference input of which is bearing the reference letter n.

The operation of the comparator V1 is such that its output condition changes from L to H as soon as the value of the applied count (h) of the counter will exceed the value at the reference input (n) of the comparator. The value n exceeds the number of cycles utilized in a message during a start signal. The output signal of the comparator V1 is connected through lines 178 and 180 to a second input each of the NAND-gates 144 and 146, the outputs of which are coupled to the inputs of a bistable flip-flop FF2.

The outputs 183 and 184, respectively, of this bistable flip-flop are assigned to one driving direction each. FIG. 13 shows this evaluation circuit 129 incorporated in a vehicle equipment similar to that of FIG. 7. The inputs 130 and 132 are connected to one output each of a decoder provided for in the receiver of the vehicle equipment, the output of this decoder 185 providing an impulse for the upper frequency upon recognition of any period, while an impulse for the lower frequency is correspondingly supplied by output $f_u$. The direction signal produced in the recognition circuit is thereupon, just as in the circuit according to FIGS. 4 and 6, fed to the parallel-serial-converter 186'. The bit counter 188 can be designed for 17 bits, in this circuit arrangement, to be capable of receiving the additional information on the driving direction of the vehicle.

Operation of circuit ilustrated in FIG. 12 and FIG. 13: an input signal present at one of the inputs 130 or 132, respectively, sets the respective MFF MF3 or MF4.

The counter Z1 is unblocked as soon as the clear-signal is removed.

As soon as the count h of the counter exceeds the value n preset at the reference input, the output of the comparator V1 will assume the level H and clear the gates 144 and 146 through lines 178 and 180, so that, depending upon whether the impulse sequence is supplied by the decoder 186 (FIG. 13) output is $f_o$ or $f_u$, the bistable flip-flop FF2 is switched over, so that a signal condition H representing the corresponding information on the driving direction of the vehicle appear at the respective associated output 182 or 184. If the count h of the counter does not rise to the reference value n, the counter will be reset upon the next frequency change, occurring due to change over at the output of one of the monostable multivibrators MF3 or MF4, of the signal condition L to the signal condition H.

If there is no input signal at the inputs 130 and 132, both monostable multivibrators MF3 and MF4 will have been deenergized, and, as a result thereof, the counter will be cleared.

A further and preferred embodiment of a traffic guidance system includes, according to the present invention, a driving direction recognition circuit in which the road equipment units are marked or identified.

A road section including several intersections and junctions is illustrated in FIG. 14 in simplified form.

The junctions or intersections, respectively, of this roadway portion are referred to as K1-K5, four road equipment units S11-S14 being assigned to the 4-way intersection K1, S21-S24 to intersection K2, S51-S54 to K5, and similarly S31-S34 to K3, and three road equipment units S41-S43 to the 3-way intersection K4.

All road equipment units associated with one intersection or junction, respectively, are assigned to one signal station, and are marked by the same coding or combination of figures. The road equipments of the signal station at the intersection K2, for example, bearing the identification I, whereas the junctions K1, K3, and K4 are provided with the identification II and the intersection K5 with the identification III.

If all road equipments united in one signal station have the same identification signal—the identification signals of signal stations directly following one another, however, being different—only three different identification signals are required, provided that a road equipment unit only responds to call vehicle signals the identification of which differs from that of the signals of the road equipment unit. For the identification as described only two additional bits are necessitated.

Upon information exchange between a vehicle and the road equipment of a signal station, the identification signal of the road equipment signal station is stored in the vehicle equipment in order to detect the driving direction of the respective vehicle. As all road equipment units of this signal station have the same identification, any further exchange of information with a further loop of this signal station is thus excluded.

Due to the stored identification signal, further exchange of information cannot occur before the next junction, which is provided with a different identification, is reached by the vehicle.

Upon this next following exchange of information, the previously stored identification signal is erased, while the new identification signal together with the advice for reaching the destination is transmitted to the vehicle equipment and stored therein.

In the described solution both road equipment units and vehicle equipment units take part in the recognition of the driving direction of the vehicle, whereas according to prior embodiments the recognition of the driving direction had been carried out either in the road equipment or in the vehicle equipment.

In spite of this fact, this embodiment of the present invention based on the identification of the signal station requires only very little apparatus.

FIG. 15 illustrates a vehicle equipment of known type, and similar to FIG. 7, but modified according to the present invention, wherein the bit counter 192 and the buffer memory 194 disposed in the receiving unit are now designed for 10 bits each (rather than 8) in order to be capable of processing the message and two identification bits of the signal stations. Elements described in connection with FIG. 7 will not be described again.

The additionally received bits are fed from the message decoding and storing unit 196 through AND-circuits 198, 200, which, after first processing the length and identity of the message, are no longer blocked, to the parallel-serial converter 202, wherein they are added to the 16 bits of the read-in destination address. For receiving the extended address, a bit counter 204 designed for 18 bits is associated with the parallel-serial converter.

From this identification signal, transmitted to the vehicle equipment when the vehicle is passing over a signal station, and stored in this vehicle equipment, the road equipment unit of the next signal station the car traverses can then recognize the driving direction of the vehicle.

FIG. 16 illustrates a simplified block diagram of a road equipment unit designed so as to be capable of performing the described recognition of the driving direction of the vehicle.

In order to be capable of receiving the additional 2 bits for the identification signal, both the bit counter 208 and the buffer memory 210 disposed in the receiving unit of the road equipment are designed for 18 bits.

The destination address contained in the message is fed through an AND-gate 216, which, after first checking on the identity of the message, will no longer be blocked, to two storage and programming units 218A and 218B assigned to one of the two driving directions each. The two bits for recognizing the driving direction, which are in addition contained in the message, are applied, after first checking on the identity of the message, from the message decoding and storing unit 212 to a direction docoder 214, wherein they are converted to information on the driving direction.

In dependence on the recognized direction, a direction signal will then appear on one of the two lines 220 or 222, respectively. The lines 220 and 222 lead to one input each of an AND-gate 224, 226 the other input of which is connected to the output of one of the two direction storages 218A or 128B, respectively. Depending upon the respective direction signal appearing at the output of the direction decoder 214, a direction advice is fed to the parallel-serial-converter 228, this direction advice relating to the direction recommended for reaching the destination according to the destination address stored in the respective direction store 218A or 218B.

An input unit 230 provides outputs comprising an identification signal of 2 bits, and giving the address of the road equipment itself. These 2 bits are applied to the parallel-serial converter 228. A bit counter 232 connected to the converter 228 is designed for 10 bits to be capable of receiving both the 8 bits of the direction advice and the 2 bits of the road unit address identification signal. The 2 bits of the identification of the address of the road equipment itself will then be transmitted, upon information exchange, together with the direction advice to a vehicle equipment, and be stored therein until a further exchange of information with a road equipment having a different identification takes place.

The requirement consisting in that a road equipment will respond exclusively to call signs having identifications differing from the preset identification address of the road equipment itself is advantageously and simply met in the illustrated embodiment of the present invention by the direction decoder 214 decoding also the identification signal of the preset identification address of the road equipment itself. Upon recognition of the address of the road equipment itself, an output signal is applied to an input of the then blocked AND-gate 216 through an inverter 236 located in a further outgoing line 234 of the direction decoder, to block the branched line going from the AND-gate 216 to the storage and programming units A and B.

The direction decoder 214 may convert, in known manner, the 2-bits-information of the applied direction identification signal into coded signals, e.g., to a one-out-of-four code causing an output signal at one of the direction outputs 220, 222, 234, respectively. It may use a bridged matrix, or code-connection.

We claim:
1. Vehicular direction guidance system to guide a vehicle for movement over a highway (10) forming part of a highway network to a destination, or target comprising
vehicle mounted equipment means forming a traffic and direction communication arrangement and
road electronic equipment units distributed at various points on the highway network,
said road electronic equipment units including an induction loop and embedded in the road surface of the highway;
the vehicle mounted equipment means located on the vehicle including information display means and an antenna located on the vehicle to provide exchange of information between the road equipment unit and the vehicle equipment means to pass information back and fourth by inductive coupling between the induction loop and the antenna
said vehicle having means providing a destination address for transmission to the road equipment units
and the road equipment units after receiving information from the vehicle mounted equipment means defining a destination, providing routing information to reach said destination to the vehicle mounted equipment means for display by said display means,
wherein
a plurality of road electronic equipment units are located at highway intersections (K1 . . . K5) of said highway network and associated in respective groups (S11, S12 . . . S14; S21, S24 . . . S,54);
the loops (12, 72, 114) of said units extending across the highway (10) and covering opposed directions of movements of vehicles over the highway,
direction recognition circuit means are provided decoding signals received from the antenna and providing an output signal determinative of the direction of movement of the vehicle in the highway network;
the units of one group (e.g. S21, S22 . . . S24) associated with any one intersection (e.g. (K2)) having the same intersection code (e.g. I) associated therewith,
the coding (I, II, III) of adjacent sequential intersections (K1, K2 . . . K5) along the highway network being different;
storage means associated with the vehicle mounted equipment means and storing the coding of the code of the road equipment unit sensed by the antenna then being passed;
vehicle mounted means controlling the transmission of a previously stored code (e.g. II) of a prior road equipment unit (e.g. S12), together with the destination code of desired destination for the vehicle to the next subsequent road equipment unit (e.g. S21) from the antenna of the vehicle mounted equipment means to the loop of the road electronic equipment unit (e.g. S21) to be passed;
road located means controlling transmission to the vehicle mounted equipment means of the code (e.g. I) of the road equipment unit (e.g. S21) then being passed together with the information representative of movement and direction to reach said destination, and controlling replacing the previously stored code (II) of the prior road equipment unit (S12) with the code (I) of the road equipment unit (e.g. S21) then being passed;
and decode means connected to the respective road electronic equipment units and sensing road equipment codes, and providing an enabling output signal permitting transmission of the destination information only if the code of the destination differs from the code associated with the respective road equipment unit.

2. System according to claim 1, further comprising a message storing unit (196) associated with the vehicle mounted equipment means and storing direction information and the code derived from a group of road equipment units (I, II, III), the message storing unit (196) being connected in parallel to an address memory containing the destination address, and storing the code of a prior road equipment unit to permit, subsequently, transmission of said code to a subsequent road equipment unit together with the address of the destination.

3. System according to claim 2, further comprising destination decode means associated with the vehicle mounted equipment means and testing the length and identities of information derived from a road equipment unit;

and controlled switch means (198, 200) controlled by said destination decoding means and selectively connecting the stored code of prior road equipment units in dependence on test of the length and identity of said information.

4. System according to claim 1, wherein the road equipment units include output memory means (212) having two memory portions (218A, 218B) one each associated with a respective direction of movement of a vehicle with respect to the road equipment unit;

a direction decoder (214) and controlled switch means respectively responsive to the direction decoder and controlling enablement of the respective memory portion of said output memory means, the respective memory portion being connected, in accordance with the decoded direction as commanded by said controlled switch means (224, 226) to provide direction information for transmission to the vehicle.

5. System according to claim 4, further comprising input circuit means (230) to provide data representative of the respective location of the respective road equipment unit in the respectively associated code.

6. System according to claim 5, further including blocking circuit means (216) responsive to the code of the respective equipment unit and connected between the output memory means (212) and the memory portions (218A, 218B) upon sensing of the code of the respective road unit at a further additional output (234, 236) of the direction decoder (214).

7. System according to claim 4, further including blocking circuit means (216) responsive to the code of the respective equipment unit and connected between the output memory means (212) and the memory portions (218A, 218B) upon sensing of the code of the respective road unit at a further additional output (234, 236) of the direction decoder (214).

* * * * *